(12) United States Patent
Notohara et al.

(10) Patent No.: US 9,748,887 B2
(45) Date of Patent: Aug. 29, 2017

(54) PERMANENT MAGNET SYNCHRONOUS MOTOR AND WINDING-SWITCHING MOTOR DRIVING DEVICE, AND REFRIGERATION AIR CONDITIONER AND ELECTRIC VEHICLE USING SAME

(71) Applicant: Hitachi, Ltd., Chiyoda-ku, Tokyo (JP)

(72) Inventors: Yasuo Notohara, Tokyo (JP); Eri Maruyama, Tokyo (JP); Wataru Hatsuse, Tokyo (JP); Ryouichi Takahata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/969,261

(22) Filed: Dec. 15, 2015

(65) Prior Publication Data

US 2016/0204728 A1 Jul. 14, 2016

(30) Foreign Application Priority Data

Jan. 14, 2015 (JP) ................... 2015-004646

(51) Int. Cl.
| | | |
|---|---|---|
| H02P 1/46 | (2006.01) | |
| H02P 25/22 | (2006.01) | |
| H02K 3/28 | (2006.01) | |
| B60L 15/02 | (2006.01) | |
| B60L 7/14 | (2006.01) | |
| B60L 7/16 | (2006.01) | |
| H02P 27/08 | (2006.01) | |
| F25B 31/02 | (2006.01) | |

(52) U.S. Cl.
CPC ............ *H02P 25/22* (2013.01); *B60L 7/14* (2013.01); *B60L 7/16* (2013.01); *B60L 15/02* (2013.01); *B60L 15/025* (2013.01); *H02K 3/28* (2013.01); *H02P 27/08* (2013.01); *B60L 2210/40* (2013.01); *B60L 2220/14* (2013.01); *B60L 2220/56* (2013.01); *B60L 2240/421* (2013.01); *F25B 31/026* (2013.01); *Y02T 10/641* (2013.01); *Y02T 10/643* (2013.01); *Y02T 10/7241* (2013.01)

(58) Field of Classification Search
CPC .......... B60L 2240/421; B60L 2220/56; B60L 15/02; H02P 2207/05; H02P 25/22; H02P 27/08; H02K 3/28
See application file for complete search history.

(56) References Cited

U.S. PATENT DOCUMENTS

2004/0025525 A1* 2/2004 Kubo ................. B60H 1/00385
62/230

FOREIGN PATENT DOCUMENTS

| JP | 2006-136144 A | 5/2006 |
|---|---|---|
| JP | 2008-178207 A | 7/2008 |
| JP | 2008-219956 A | 9/2008 |
| JP | 2010-200439 A | 9/2010 |
| JP | 2013-121222 A | 6/2013 |

* cited by examiner

*Primary Examiner* — Karen Masih
(74) *Attorney, Agent, or Firm* — Crowell & Moring LLP

(57) ABSTRACT

A permanent magnet synchronous motor includes at least two series-connected windings for each phase, and is configured to be driven by selecting the windings using a multi-inverter driving device configured to switch between an inverter for low-speed drive and an inverter for high-speed drive. A ratio of an induced voltage constant of at least one group of windings constituting the windings for the high-speed drive and a d-axis inductance is larger than a ratio of an induced voltage constant of all the series-connected windings to the d-axis inductance.

12 Claims, 23 Drawing Sheets

| ITEM | SERIES CONNECTION | PARALLEL CONNECTION | SINGLE WINDING (1) | SINGLE WINDING (2) |
|---|---|---|---|---|
| WINDING RESISTANCE (Ω) | 0.55 | 0.14 | 0.27 | 0.19 |
| d-AXIS INDUCTANCE (mH) | 13.0 | 3.25 | 6.5 | 3.25 |
| q-AXIS INDUCTANCE (mH) | 16.2 | 4.05 | 8.1 | 4.05 |
| INDUCED VOLTAGE CONSTANT (V/(rad/s)) | 0.37 | 0.19 | 0.19 | 0.19 |
| Id MAXIMUM CURRENT VALUE =−Ke/Ld (A) | −28.5 | −58.5 | −28.5 | −58.5 |
| NUMBER OF POLE PAIRS | 2 | | | |

SERIES CONNECTION

PARALLEL CONNECTION

PHASE CHARACTERISTIC

MOTOR CURRENT CHARACTERISTIC

PERMANENT MAGNET SYNCHRONOUS MOTOR AND WINDING-SWITCHING MOTOR DRIVING DEVICE, AND REFRIGERATION AIR CONDITIONER AND ELECTRIC VEHICLE USING SAME

BACKGROUND OF THE INVENTION

Field of the Invention

The present invention relates to a permanent magnet synchronous motor and a winding-switching motor driving device, and a refrigeration air conditioner and an electric vehicle using the same.

Description of the Related Art

The permanent magnet synchronous motor (also simply referred to as "motor" below as needed) is characterized by having higher efficiency than the induction motor, and the application range of the motors has been widened to include not only the field of home appliances, but also the fields of industrial apparatuses and electronic motors.

In addition, the motors, appliances, and apparatuses are required to achieve higher efficiency at a low-speed rotation range (light load) in order to meet the movement toward prevention of global warming and energy saving, and are also required to have ability to drive at a high speed rotation range (high load) in order to improve the sense of use (comfortability) of the appliances and apparatuses.

As an example, a room air conditioner as a home appliance is required to improve both an annual energy consumption efficiency (Annual Performance Factor, abbreviated as "APF" below as needed) which is an indicator of energy saving, and a heating capability at an outdoor temperature of 2° C. (heating capability under low temperature), which is an indicator of high output.

As another example, a main engine of an electronic automobile or the like is generally driven at low speed with high torque and at high speed with low torque, and is required to achieve higher efficiency under the aforementioned driving conditions.

As means for making a motor driving device achieve higher efficiency (at a lowspeed rotation range, in particular), there is low speed design of the motor by increasing an amount of magnet and windings. In the motor with low speed design, however, the drive range may be narrowed due to an increase in an induced voltage generated at a high-speed rotation range, and the efficiency at the high-speed rotation range may decrease significantly.

To address this, a method of boosting a DC voltage has been put into practice as means for enlarging the high-speed rotation range of the motor with low speed design. This method, however, requires addition of a circuit for boosting a DC voltage, and has problems of an increase in the circuit scale, and an increase in the loss of the booster circuit or the like.

As means for solving the aforementioned problems, there have been proposed Japanese Patent Application Publication Nos. 2010-200439 (Patent Document 1), 2008-178207 (Patent Document 2), 2008-219956 (Patent Document 3), 2006-136144 (Patent Document 4), and 2013-121222 (Patent Document 5).

Patent Document 1 describes a method of decreasing a generated induced voltage by using a method of switching windings of the motor with a mechanical switch (see [Abstract] and FIG. 1).

Patent Document 2 describes a method of switching a neutral point of the motor by using semiconductor switches connected to an outside of the motor (see [Abstract] and FIG. 1). Use of the semiconductor switches enables switching while the motor is being driven.

Patent Document 3 describes a method in which two inverter main circuits are connected to motor windings instead of forming a neutral point of the motor windings, and the driving phases of the two inverter main circuits are adjusted, so that a voltage to be applied to the motor can be increased from a normal inverter drive level (see [Abstract] and FIG. 1). This method is also capable of enlarging the drive range without stopping the motor.

Patent Document 4 describes a method in which a pair of inverter main circuits (two inverter main circuits) are connected to windings, respectively, and at least one of the back electromotive force waveform and the current waveform of each winding is formed into a pseudo-rectangular wave shape (see [Abstract] and FIG. 7). This method is also capable of enlarging the drive range without stopping the motor.

Patent Document 5 describes a method in which plural inverter main circuits are connected to terminals of motor windings connected in series, and the motor is driven at a low-speed rotation by use of the inverter main circuit connected to the windings connected in series, and driven at a high speed rotation by use of the inverter main circuit connected to intermediate terminals of the windings connected in series (see [Abstract] and FIG. 1). This method involves driving by switching the inverter main circuits depending on the driving condition of the motor. Thus, this method is capable of switching the windings without stopping the motor, and causes no loss in the inverter main circuits or the like, since the number of inverter main circuits driven is always only one.

The foregoing Patent Documents 1 to 5 have the following problems, however.

The technique disclosed in Patent Document 1 needs a mechanical change of the mechanical switch or the like, and requires the motor being driven to be stopped once to switch the mechanical switch. For this reason, this method is difficult to apply no apparatuses which need to be driven continuously, such as main engines of electric automobiles.

The technique disclosed in Patent Document 2 is the method of switching by use of semiconductor switches, and is capable of switching while the motor is being driven. However, this method has a problem that a loss in the semiconductor switches always occurs.

The techniques disclosed in Patent Documents 3 and 4 require the two inverter main circuits for driving the motor to be driven concurrently, which leads to a problem that a loss in the inverter main circuits is doubled to reduce the circuit efficiency.

The technique disclosed in Patent Document 5 solves the aforementioned problems pointed out regarding Patent Documents 1 to 4, but still has room for improvement in achievement of higher efficiency at a low-speed rotation range and enlargement of the drive range at a high-speed rotation range, because the motor itself has a conventional structure.

SUMMARY OF THE INVENTION

The present invention has been made in view of the foregoing problems, and has an object to provide a permanent magnet synchronous motor and a winding-switching motor driving device, which achieve higher efficiency at a low-speed rotation range and enlargement of the drive range at a high-speed rotation range and also achieve even higher output, and to provide a refrigeration air conditioner and an electric vehicle which use the motor and device.

The following configuration is provided in order to solve the problems and achieve the objective of the present invention.

A permanent magnet synchronous motor of the present invention is a permanent magnet synchronous motor including at least two series-connected windings for each phase, and configured to be driven by selecting the windings using a multi-inverter driving device configured to switch between en inverter for low-speed drive and an inverter for high-speed drive. The permanent magnet synchronous motor of the present invention is characterized in that a ratio of an induced voltage constant of at least one group of windings constituting the windings for the high-speed drive and a d-axis inductance is larger than a ratio of an induced voltage constant of all the series-connected windings to the d-axis inductance.

Other additional means according to the present invention will be described in the following detailed description of the embodiments.

According to the present invention, it is possible to provide a permanent magnet synchronous motor and a winding-switching motor driving device, which achieve higher efficiency at a low-speed rotation range and enlargement of the drive range at a high-speed rotation range and also achieve even, higher output, and to provide a refrigeration air conditioner and an electric vehicle which use the same.

BRIEF DESCRIPTION OF THE DRAWINGS

FIG. 5A shows the motor windings in the series connection, and FIG. 5B shows the motor windings in the parallel connection.

FIG. 6A is the graph showing a relationship between a voltage phase and a rotational speed, as well as a relationship between a current phase and the rotational speed. FIG. 6B is the graph showing a relationship between a d-axis current value and the rotational speed, as well as a relationship between a q-axis current value and the rotational speed.

FIG. 7A is the graph showing a relationship between a voltage phase and the rotational speed, as well as a relationship between a current phase and the rotational speed. FIG. 7B is the graph showing a relationship between a d-axis current value and the rotational speed, as well as a relationship between a q-axis current value and the rotational speed.

DETAILED DESCRIPTION OF THE EMBODIMENTS

Modes for carrying out the present invention (hereinafter referred to as "embodiments") will be hereinafter described in detail with reference to the accompanying drawings. Incidentally, throughout all the drawings for explaining the embodiments, the same members are basically denoted by the same reference signs, and duplicate descriptions will be omitted as appropriate.

First Embodiment: Permanent Magnet Synchronous Motor

Descriptions will be hereinbelow provided for a permanent magnet synchronous motor of a first embodiment of the present invention.

It should be noted that because the permanent magnet synchronous motor of the first embodiment of the present invention is closely connected with a driving method, descriptions of a winding-switching motor driving device will be added into the descriptions of the permanent magnet synchronous motor as needed.

In addition, as a main component, the permanent magnet synchronous motor will be described together with contents under subtitles "Schematic Configuration of Permanent Magnet Synchronous Motor," "Relationship between Permanent Magnet Synchronous Motor and Winding-switching Motor Driving Device," "Detailed Configuration of Permanent Magnet Synchronous Motor," "Comparison of Characteristics," and "Effects of First Embodiment" in this order.

Furthermore, descriptions of the contents under the subtitle "Comparison of Characteristics" will be divided into subsections depending on the necessity.

[Schematic Configuration of Permanent Magnet Synchronous Motor]

Figure 1:
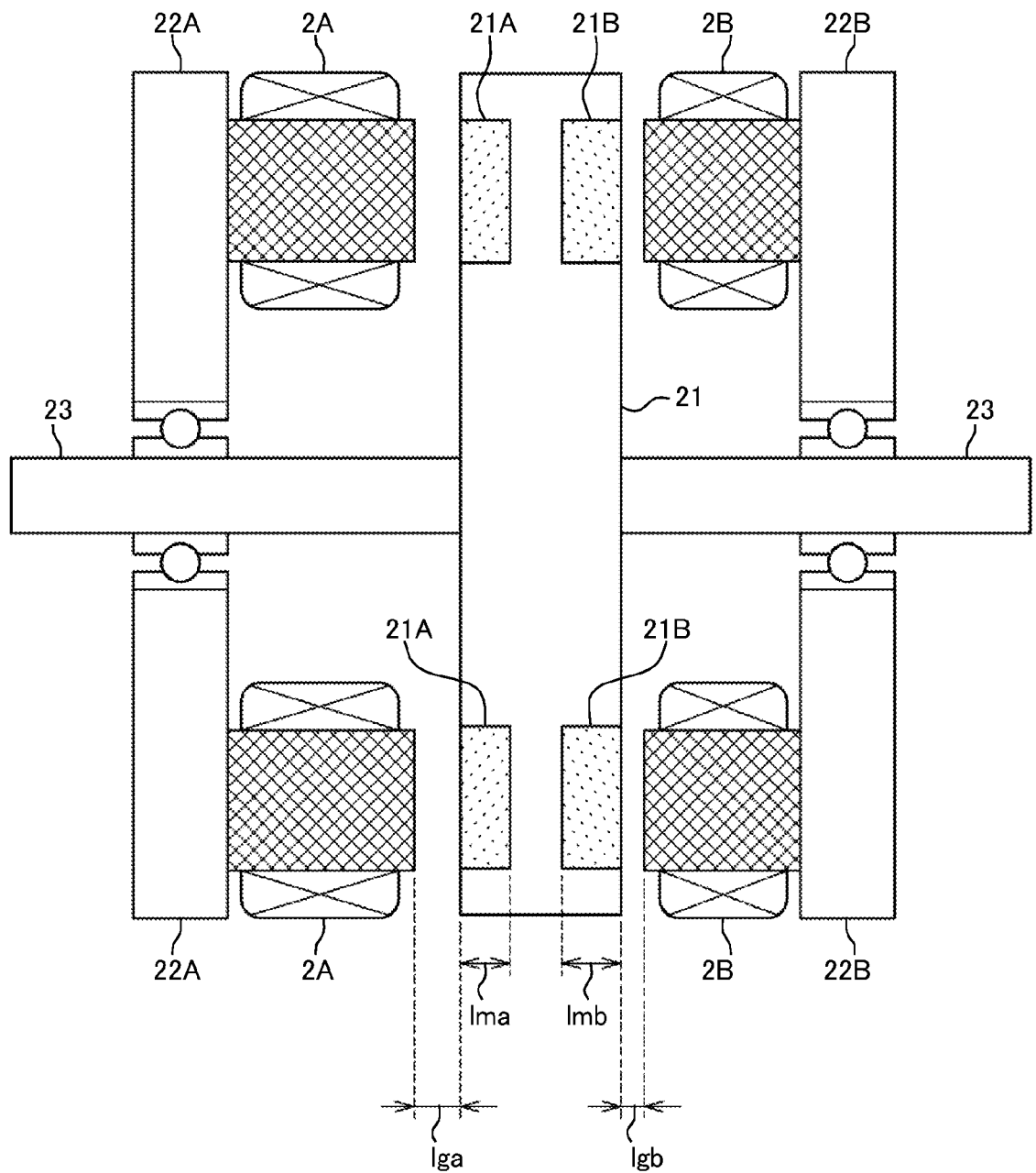
FIG. 1 is a cross-sectional view showing a schematic configuration of the permanent magnet synchronous motor of a first embodiment of the present invention.

FIG. 1 is a cross-sectional view showing of a schematic configuration of the permanent magnet synchronous motor of the first embodiment of the present invention.

The permanent magnet synchronous motor shown in FIG. 1 has a double-stator axial-gap structure.

In FIG. 1, the permanent magnet synchronous motor includes a rotor 21, stators (22A, 22B) and a shaft 23.

The rotor 21 includes a permanent magnet 21A and a permanent magnet 21E. The permanent magnet 21A and the permanent magnet 21B are disposed respectively on two sides of the rotor 21.

In addition, the stators (22A, 22B) include: the stator 22A including a winding 2A; and the stator 22B including a winding 2B.

FIG. 1 shows the winding 2A and winding 2B in different sizes, because the winding 2A and winding 2B are different from each other in terms of characteristics and structure such as the number of turns of windings. Furthermore, FIG. 1 shows the thickness Ima of the permanent magnet 21A and the thickness Imb of the permanent magnet 21B as being different from each other.

Moreover, FIG. 1 shows the gap Iga between the winding 2A and the permanent magnet 21A, as well as the gap Igb between the winding 2B and the permanent magnet 21B, as being different from each other.

As described above, the permanent magnet synchronous motor of the first embodiment of the present invention is characterized in that: the stator 22A formed from a winding 2A is different from the stator 22B formed from a winding 25; and the relationship of the rotor 21 including the permanent magnet 21A and the permanent magnet 21B to the stator 22A is different from the relationship of the rotor 21 to the stator 22B.

Before explaining details of the characteristics, descriptions will be provided for a relationship between the permanent magnet synchronous motor of the first embodiment and the winding-switching motor driving device for driving the permanent magnet synchronous motor. Thereafter, descriptions will be provided again for details of the permanent magnet synchronous motor of the first embodiment of the present invention.

[Relationship between Permanent Magnet Synchronous Motor and Winding-Switching Motor Driving Device]

Descriptions will be provided for the relationship between the permanent magnet synchronous motor and the winding-switching motor driving device, that is to say, a configuration and a basic operation for driving the permanent magnet synchronous motor by use of the winding-switching motor driving device.

Figure 2:
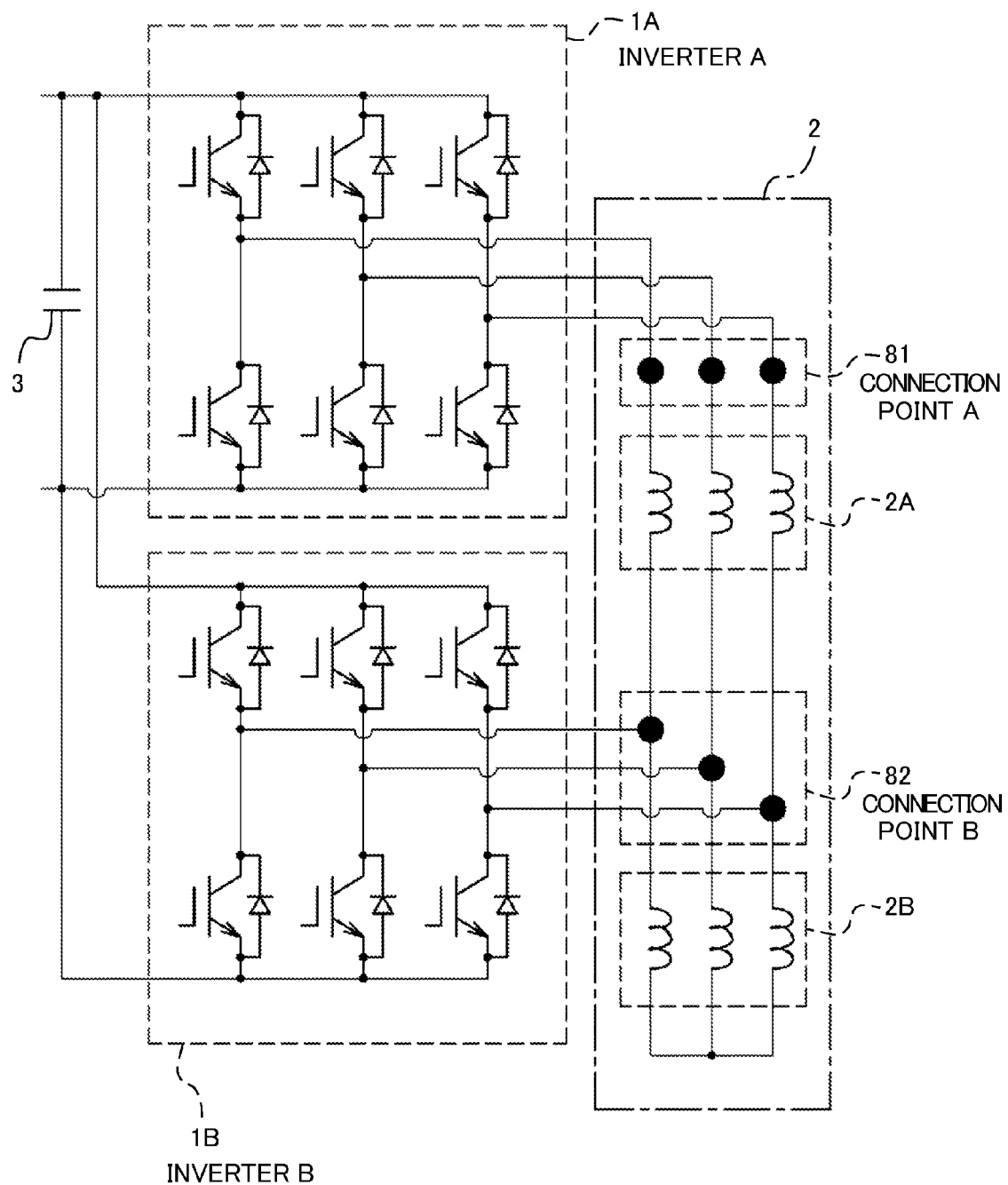
FIG. 2 is a diagram showing: a circuit configuration for driving a winding 2 included in the permanent magnet synchronous motor of the first embodiment of the present invention by use of inverter circuits included in the winding-switching motor driving device; and a relationship between the winding and the inverter circuits.

FIG. 2 is a diagram showing: a circuit configuration for driving a winding 2 included in the permanent magnet synchronous motor of the first embodiment of the present invention by use of inverter circuits (1A, 1B) included in the winding-switching motor driving device; and a relationship between the winding 2 and the inverter circuits (1A, 1B).

In FIG. 2, the winding-switching motor driving device includes the inverter circuit 1A (inverter A, first inverter circuit), the inverter circuit 1B (inverter B, second inverter circuit), and a capacitor 3.

Furthermore, the inverter circuits 1A, 1B will be hereinbelow referred to, respectively, as an "inverter A" and an "inverter B" as needed.

Moreover, as described above, the winding 2 including the winding 2A and the winding 2B is included in the permanent magnet synchronous motor with a three-phase winding structure (hereinafter referred to as a "motor" as needed).

Incidentally, the winding will be referred to as a "motor 2" on behalf of the permanent magnet synchronous motor.

In each phase of the motor 2 (winding 2) with the three-phase winding structure, the windings (winding 2A and winding 2B) are connected together in series. The structure is designed such that the motor 2 (winding 2) can be connected to the outside via multiple connection points inclusive of connection points for the series connection.

Furthermore, the outputs of the inverter A and the outputs of the inverter B are connected to the multiple connection points.

To put it concretely, the outputs of the inverter A are connected to the connection point A (81) which is a terminal portion of the three-phase winding, while the outputs of the inverter B are connected to the connection point B (82) of the motor 2 which is the connection point between the winding 2A and the winding 2B.

In this respect, the configuration and structure are designed such that an induced voltage produced during the rotation of the motor is higher at the connection point A than at the connection point B.

In addition, a smoothing capacitor 3 is supplied with a DC electric power from a rectifier circuit for rectifying an AC power supply or from a battery or the like (not illustrated).

Furthermore, the control of the inverter A and the inverter B is performed using a PWM (Pulse Width Modulation) control method. However, no specific restriction is imposed on the method of controlling the individual inverters.

Depending on how the motor is operating, the foregoing configuration drives the windings 2A, 2B of the motor 2 using either the inverter A or the inverter B.

To put it concretely, while the motor is rotating at low speed, the series-connected windings 2A, 2B are driven using the inverter A.

Because the induced voltage produced by the series-connected windings 2A, 2B is large, a motor current of the motor 2 is small. This makes it possible to reduce: conduction loss and switching loss which are inverter losses; and copper loss and iron loss which are motor losses.

On the other hand, while the motor is rotating at high speed, only the winding 2B is driven using the inverter B.

This is because if the series-connected windings 2A, 2B are driven using the inverter A during high-speed drive, the induced voltage produced by the windings 2A, 2B increases to become higher a DC voltage of the inverter A, and is accordingly more likely to make the operation of the motor 2 unstable.

For this reason, the windings 2A, 2B needs to be driven while offsetting the induced voltage using field weakening control or the like. This increases the inverter loss and the motor loss.

Meanwhile, in the case where only the winding 2B is driven using the inverter B connected to the connection point B, the induced voltage decreases by half, and the high-speed drive can be performed without using the field weakening control or the like. Accordingly, a reduction in the inverter loss and the motor loss can be achieved.

It should be noted that the method of driving the series-connected windings 2A, 2B using the inverter A while the motor is rotating at low speed, and only the winding 2B using the inverter B while the motor is rotating at high speed is virtually equivalent to the selecting of either the inverter A or the inverter B.

[Detailed Configuration of Permanent Magnet Synchronous Motor]

In FIG. 1, as described above, the stator 22A includes the winding 2A, while the stator 22B includes the winding 2B.

In this respect, the inductance of the winding 2B is set at half (50%) of the inductance of the winding 2A. To put it concretely, the number of turns of the winding 2B is set at approximately 70% of the number of turns of the winding 2B.

Incidentally, the inductance of a winding is proportional to the square of the number of turns of the winding. For this reason, the foregoing number-of-turns ratio is selected based on a relationship of $(0.7)^2 = 0.49$.

In addition, the thicknesses ($l_{ma}$, $l_{mb}$), magnetic flux densities ($\beta_{ma}$, $\beta_{mb}$) at a time of no-load operation, and air gap lengths ($l_{ga}$, $l_{gb}$) of the permanent magnets 21A, 21B are set such that the induced voltages (induced voltage constants) produced in the windings 2A, 2B are equal to each other, respectively.

Incidentally, the thicknesses of the permanent magnets 21A, 21B mean the magnet lengths ($l_{ma}$, $l_{mb}$) in the magnetization direction.

In addition, each air gap length is set with a Carter's coefficient taken into consideration.

In other words, the ratio ($Ke_b/Ld_b$) of the induced voltage constant $Ke_b$ to the d-axis inductance $Ld_b$ in the winding 2B is set at double the ratio ($Ke_a/Ld_a$) of the induced voltage constant $Ke_a$ to the d-axis inductance $Ld_a$ in the winding 2A.

In addition, the ratio ($Ke_b/Ld_b$) of the induced voltage constant $Ke_b$ to the d-axis inductance $Ld_b$ in the winding 25 is set at 1.5 times the ratio ($Ke_{ab}/Ld_{ab}$) of the induced voltage constant $Ke_{ab}$ to the d-axis inductance $Ld_{ab}$ in the series-connected windings 2A, 2B.

In this respect, the magnetic flux density β in the air gap is adjustable using the thicknesses ($l_{ma}$, $l_{mb}$), magnetic flux densities ($\beta_{ma}$, $\beta_{mb}$) at the time of no-load operation, and air gap lengths ($l_{ga}$, $l_{gb}$) of the permanent magnets, as shown by Equation (1) given below.

[Equation]

$$\beta = \frac{\beta m \cdot lm}{lg + lm} \qquad (1)$$

In the above equation, β denotes the magnetic flux density in the air gap; $\beta_m$ denotes the magnetic flux density of the permanent magnet at the time of no-load operation; $l_m$ denotes the magnet length in the magnetization direction; and $l_g$ denotes the air gap length set with the Carter's coefficient taken into consideration.

In short, the design is made such that an amount of decrease in the induced voltage due to the decrease in the number of turns is equal to an amount of induced voltage produced by an increase in the magnetic flux density in the air gap.

The embodiment has explained that the adjustment of the induced voltage constant and the inductance is achieved using the number of turns of the winding, the thickness of the magnet, the residual magnetic flux density, and the air gap length. However, the adjustment may be achieved by changing the specification for the winding, the shape of the magnet, the placement of the magnet, the shape of the rotor, and the like.

Furthermore, an amount of decrease in the induced voltage constant and an amount of decrease in the inductance may be set in accordance with the specification required for the system to which the induced voltage constant and the inductance are applied.

How to change the specification for the winding will be explained in a later-described second embodiment.

[Comparison of Characteristics]

Next, comparison of various characteristics will be shown using FIGS. 3 to 8. Through the comparison of the characteristics, descriptions will be provided for the effects of the embodiment.

[Characteristic of Rotational Speed Vs. Output Torque in Each Type of Winding Structure (Part 1)]

Figures 3, 4:
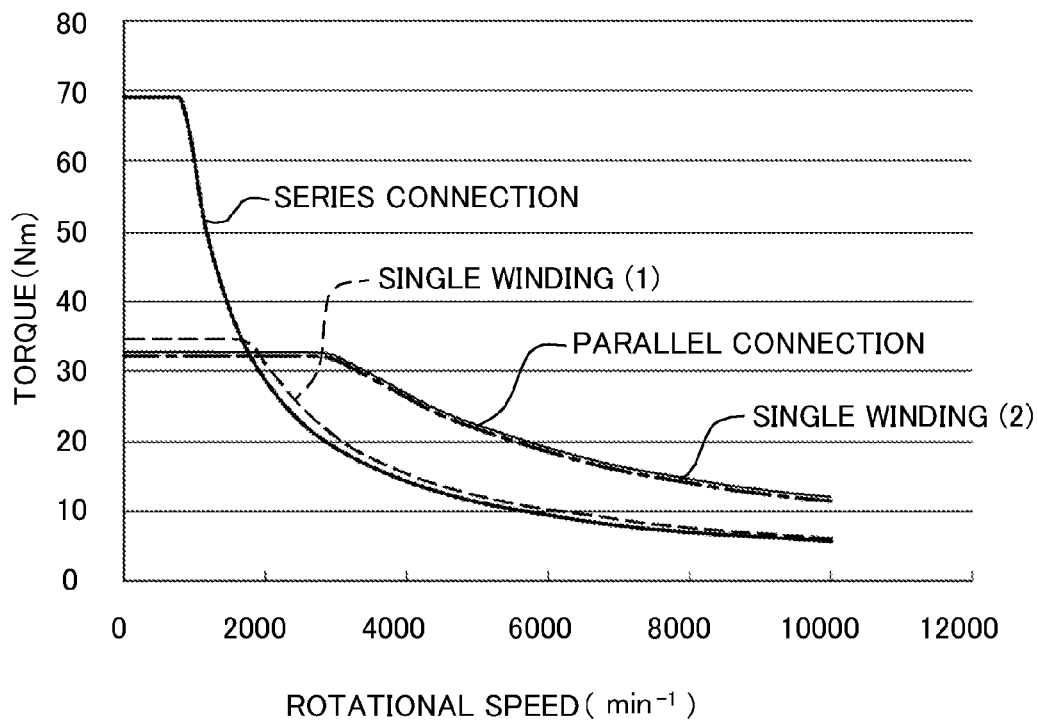
FIG. 3 is a graph showing a characteristic of a rotational speed vs. an output torque attributable to motor constants in each motor winding of the first embodiment of the present invention and various types of winding structures.
FIG. 4 is a table showing a list of various characteristics in each motor winding of the first embodiment of the present invention and the various types of winding structures.

FIG. 3 is a graph showing a characteristic of the rotational speed vs. the output torque attributable to motor constants (hereinafter referred to as an "NT characteristic" from time to time) in each of the motor winding of the embodiment of the present invention and various types of winding structures (FIG. 4).

FIG. 4 is a table showing a list of various characteristics in each of the motor winding structure of the embodiment of the present invention and the various types of winding structures.

Figure 5A:
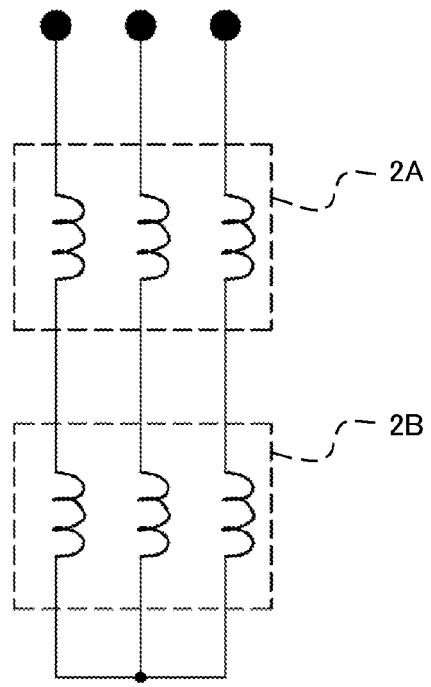
FIGS. 5A and 5B are diagrams showing winding structures of conventional techniques which are configured to switch the motor windings between series and parallel connections.
Figure 5B:
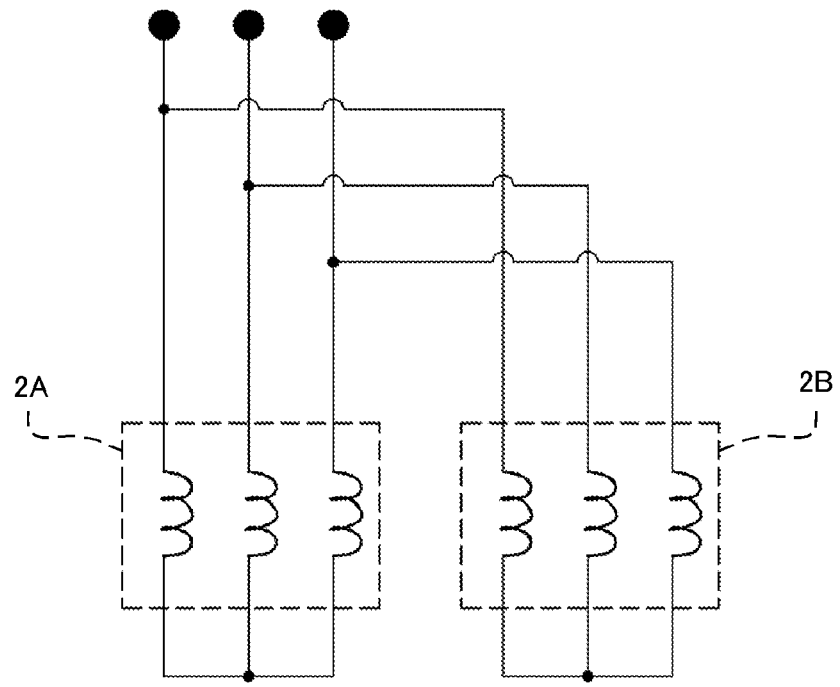

FIG. 5 includes diagrams showing a winding structure of a conventional technique which is configured to switch the motor windings between the series and parallel connections. FIG. 5A shows the motor windings in the "series connection," and FIG. 5B shows the motor windings in the "parallel connection."

Before describing the characteristic of the rotational speed vs. the output torque attributable to the motor constants in each type of winding structure which is shown in FIG. 3, descriptions will be provided for a list of the characteristics in each type of winding structure which is shown in FIG. 4, and the winding structure configured to switch the motor windings between the series and parallel connections which is shown in FIG. 5. Thereafter, descriptions will be provided for the characteristic of the rotational speed vs. the output torque attributable to the motor constants in each type of winding structure which is shown in FIG. 3.

[List of Characteristics in Each Type of Winding Structure]

As described above, FIG. 4 is the table showing the list of the characteristics in each type of winding structure.

The "items" representing the characteristics in each winding structure are a "winding resistance (O)," a "d-axis inductance (mH)," a "q-axis inductance (mH)," an "induced voltage constant (V/(rad/s))," an "Id maximum current value (−Ke/Ld (A))," and the "number of pole pairs."

In addition, four types of winding structures, that is to say, winding structures referred to as a "series connection," a "parallel connection," a "single winding (1)," and a "single winding (2)" will be discussed.

FIG. 4 shows a list of characteristic values in the four types of winding structures for each of the "items."

Incidentally, descriptions of a concrete meaning of each "item" will be provided at a corresponding place, depending on the necessity.

To begin with, the concrete structures and configurations of the four types of winding structures as above referred to will be described.

[Each Type of Winding Structure (Part 1)]

First of all, descriptions will be provided for the structure and configuration which are concretely meant by each of the winding structures referred to as the "series connection" and the "parallel connection" in FIGS. 3 and 4

As described above, FIG. 5 includes the diagrams showing the winding structure of the conventional technique which is configured to switch the motor windings between the series and parallel connections.

FIG. 5A shows the concrete structure and configuration of the winding structure referred to as the "series connection," and FIG. 5B shows the concrete structure and configuration of the winding structure referred to as the "parallel connection.

In FIG. 5A, the phases (U phases, V phases and W phases) of the windings 2A, 2B having the same specification (induced voltage constant, and d-axis inductance) are connected together in series, respectively. This structure and configuration are referred to as the "series connection."

In FIG. 5B, the phases (U phases, V phases and W phases) of the windings 2A, 2B having the same specification (induced voltage constant, and d-axis inductance) are connected together in parallel, respectively. This structure and configuration are referred to as the "parallel connection."

As a result, in FIG. 1, in each of the combined "winding resistance (Ω)," the combined "d-axis inductance (mH)," and the combined "q-axis inductance (mH)" of a circuit as a whole, the value of the "parallel connection" is approximately a quarter of that of the "series connection."

Incidentally, the induced voltage constant of the "parallel connection" is approximately a half of that of the "series connection."

[Each Type of Winding Structure (Part 2)]

Next, descriptions will be provided for the structure and configuration which are concretely meant by each of the winding structures referred to as the "single winding (1)" and the "single winding (2)."

Both the "single winding (1)" and the "single winding (2)" represent the winding 2B, not the winding 2A, in FIG. 2. In other words, this is a case where only the inverter B (1B) drives while the inverter A (1A) makes no output.

Meanwhile, the winding 2B of the "single winding (1)" has the same configuration as the winding 2A.

This case will be referred to as the "single winding (1)."

In contrast to this, the winding 2B of the "single winding (2)" is set in accordance with a specification different from that of the winding 2A. To put it concretely, the d-axis inductance and the q-axis inductance of the winding 2B are set at halves of those of the winding 2A, and the induced voltage constant of the winding 2B is set equal to that of the winding 2A.

This case will be referred to as the "single winding (2)."

Incidentally, as described above, the induced voltage constant can be set independently of the inductance.

[Characteristic of Rotational Speed Vs. Output Torque in Each Type of Winding Structure (Part 2)]

Referring to FIG. 4, descriptions will be provided for the characteristic of the rotational speed vs. the output torque attributable to the motor constants in each type of winding structure in FIG. 3 once again, but in detail.

The characteristic of the rotational speed vs. the output torque attributable to the motor constants (hereinafter referred to as the "NT characteristic" from time to time) in each type of winding structure, which is shown in FIG. 3, is one under conditions of a 270-volt DC voltage, the motor's effective current value (limit value) of 40 A, and a 1.15 modulation ratio (ratio of an AC component to a DC component).

The "series connection" indicated with a solid bold line in FIG. 3 corresponds to the NT characteristic which is obtained when the motor 2 is driven by the inverter A shown in FIG. 2.

In the case of the "series connection," the induced voltage constant and the winding inductances are large, as shown in FIG. 4. For this reason, high torque can be achieved during the low-speed rotation, but output torque is low during the high-speed rotation.

In contrast to this, the "parallel connection" indicated with a solid thin line in FIG. 3 represents the NT characteristic which is obtained when as shown in FIG. 5B, the windings 2A and 2B are connected together in parallel. As shown in FIG. 4, the induced voltage constant of the "parallel connection" is a half of that of the "series connection," and each winding inductance of the "parallel connection" are a quarter of that of the "series connection." For this reason, the "parallel connection" indicated with a solid thin line in FIG. 3 reduces the output torque during the low-speed rotation to a half, but can make the output torque during the high-speed rotation become larger.

This is because: a rate of decrease in each winding inductance becomes larger than a rate of decrease in the induced voltage constant; thus, the motor-applied voltage phase progresses less than in the case of the "series connection"; and the amount of field weakening control (the Id maximum current value (limit value) of the d-axis current) can be increased. In other words, this means the range of the drive which can be performed by the field weakening control becomes larger.

[Id Maximum Current Value]

Here, descriptions will be provided for the Id maximum current value shown in FIG. 4

The Id maximum current value is a value derived from conditions for the q-axis applied voltage Vq and the q-axis current Iq to become equal to zero using an equation for the q-axis voltage (omitting differential terms) expressed with Equation (2) given below. The Id maximum current value means a d-axis current value Id representing a maximum amount of d-axis current which can be made to flow during the field weakening control.

Incidentally, the d-axis and the q-axis constitute a dq-coordinate system. The d-axis represents a direction of the magnetic flux produced by the magnetic pole of the rotor (a direction of the center axis of the permanent magnet, or a direction toward the North pole). The q-axis extends at a right angle to the q-axis.

[Equation 2]

$$Vq = R \cdot Iq + \omega \cdot Ld + Ke \cdot \omega \qquad (2)$$

In this equation, Vq denotes the q-axis applied voltage; Iq denotes the q-axis current; Id denotes the d-axis current; R denotes the winding resistance; Ld denotes the d-axis inductance; Ke denotes the induced voltage constant; and w denotes the current angular velocity.

In sum, as the ratio of the induced voltage constant to the d-axis inductance become larger, the value representing the amount of d-axis current which can be made to flow becomes larger. For this reason, the control range of the field weakening control can be increased. Accordingly, the drive range during the high-speed rotation becomes larger.

In FIG. 4, the Id maximum current value in the case of the "parallel connection" is −58.5 A.

This value is larger than the motor current limit value (whose peak current value is 56.6 A, and whose effective value is 40 A multiplied by √2), and not less than the motor current limit value which is set in the system.

In short, this means that the maximum torque can be outputted under the condition which is set in the system.

In other words, if the Id maximum current value is set equal to or greater than the maximum current value which is determined by the current capacity at the element in the inverter main circuit, the largest torque of the system can be obtained.

[Characteristic of Rotational Speed Vs. Output Torque in Each Type of Winding Structure (Part 3)]

In FIG. 3, the "single winding (1)" indicated with a dashed line represents the NT characteristic which is obtained when the winding 2A and the winding 2B are designed to have the same number of turns of winding and the same inductance.

As shown in FIG. 4, when the "single winding (1)" represents the characteristic, the induced voltage constant of the "single winding (1)" is a half of that of the "series connection," and each winding inductance of the "single winding (1)" is a quarter of that of the "series connection."

Unlike the rate of decrease in each winding inductance of the "parallel connection," the rate of decrease in each winding inductance of the "single winding (1)" is small (because the Id maximum current value of the "single winding (1)" is equal to that of the "series connection). For this reason, the torque characteristic of the "single winding (1)" during the high-speed rotation is almost the same as that of the "series connection" during the high-speed rotation.

The application of even the winding specification of the "single winding (1)" makes some systems fully employ the effects of the winding specification. However, the winding specification is inapplicable to systems which are required to make higher output.

With this taken into consideration, this embodiment uses the motor 2 including the "single winding (2)" which is designed such that the inductance of the winding 2B is a half of that of the winding 2A (while the induced voltage constant of the winding 2B is equal to that of the winding 2A). This use makes it possible to obtain the NT characteristic which is almost the same as that of the "parallel connection" (and also the Id maximum current value which is equal to that of the "parallel connection") as shown by the "single winding (2)" indicated with a chain line in FIG. 3, and to make the output range become larger.

It should be noted that as described above, almost the same NT characteristic can be obtained from the "parallel connection" of the conventional technique and the "single winding (2)" of the embodiment. However, the "parallel connection" of the conventional technique is a method which needs a mechanical switch, and which has to achieve the switching between the windings by stopping the motor once while the motor is in operation. In contrast to this, the "single winding (2)" of the embodiment is a method which needs no mechanical switch, and which enables the motor to change from the low-speed drive to the high-speed drive without interruption.

[Difference between "Single Winding (1) and "Single Winding (2)" in Terms of Characteristics]

Figure 7A:
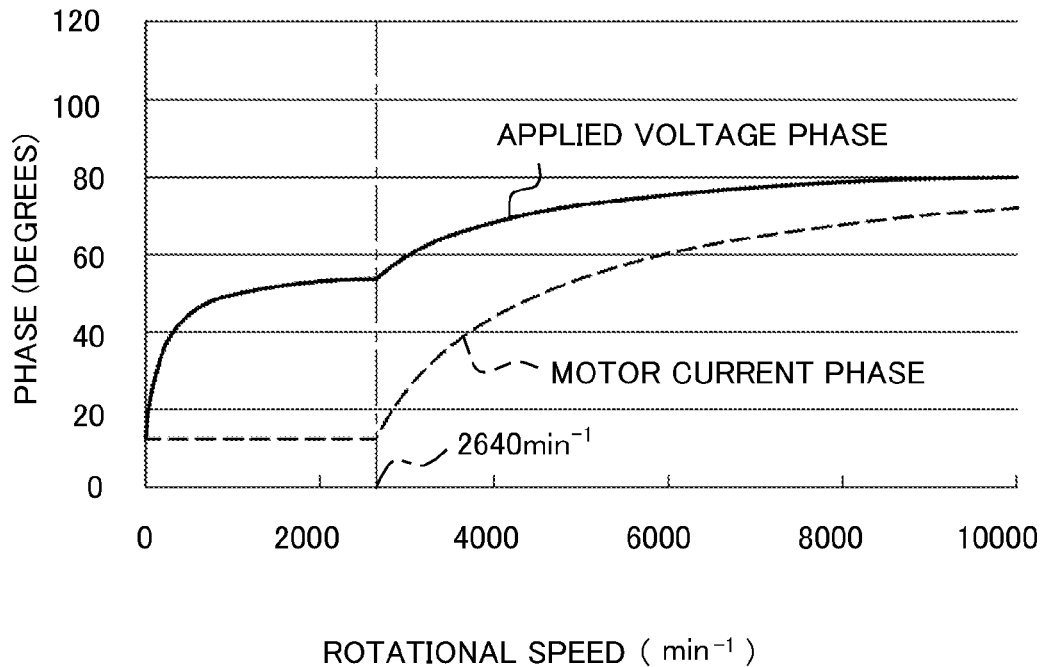
FIGS. 7A and 7B are graphs showing motor characteristics of a "single winding (2)" shown in FIG. 4.
Figure 7B:
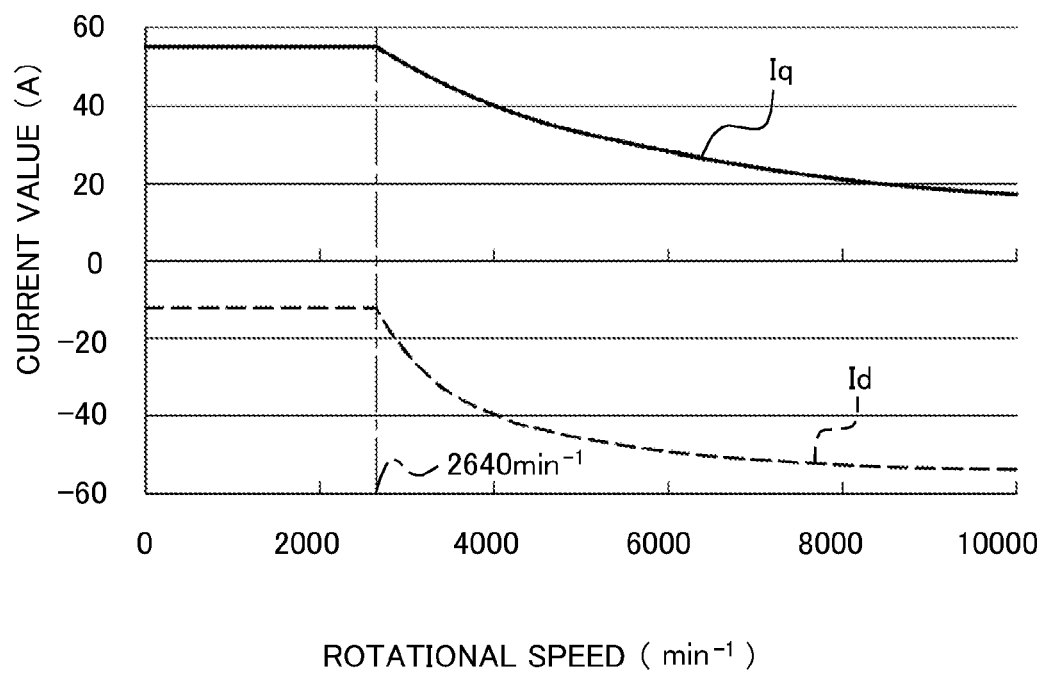
Figure 8:
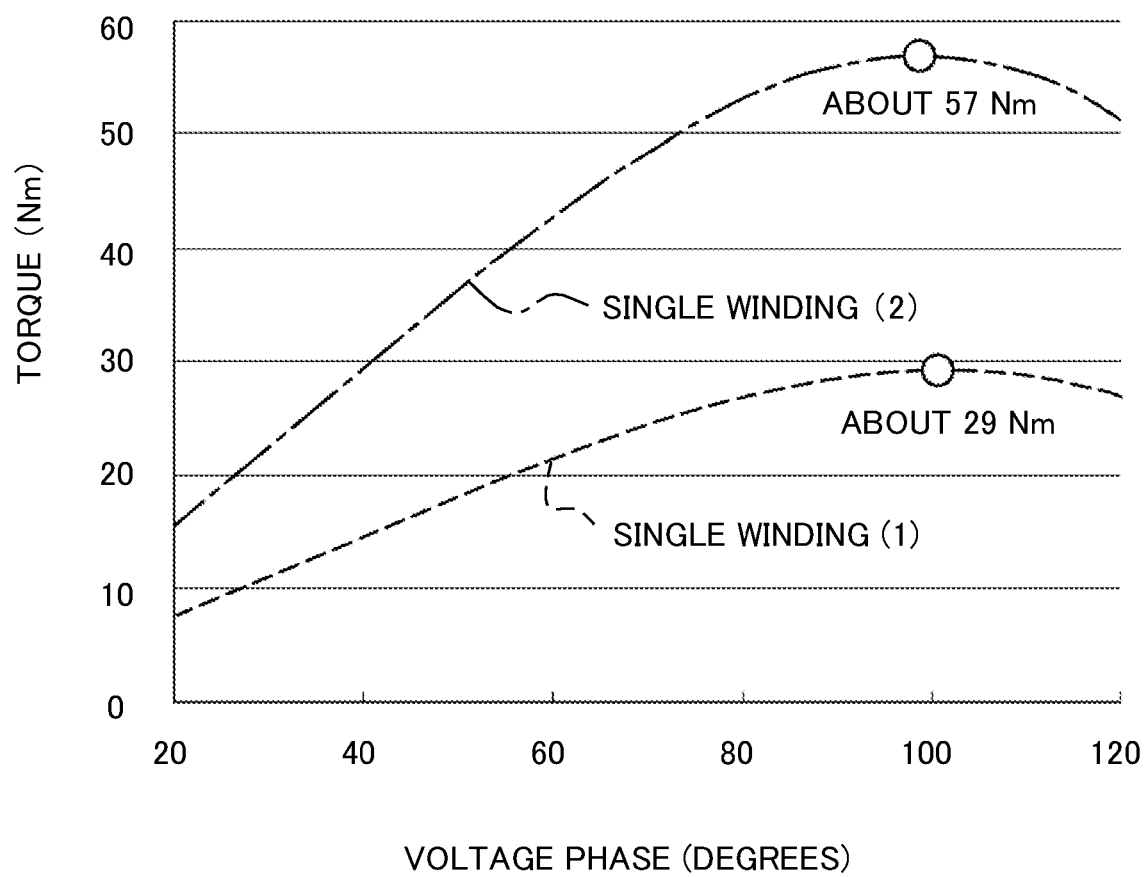
FIG. 8 is a graph showing a characteristic of a motor applied voltage phase vs. the output torque for each of the "single winding (1)" and the "single winding (2)."

Next, descriptions will be provided for how the "single winding (1)" and the "single winding (2) are different from each other in terms of characteristics using FIGS. 6 to 8.

Figure 6A:
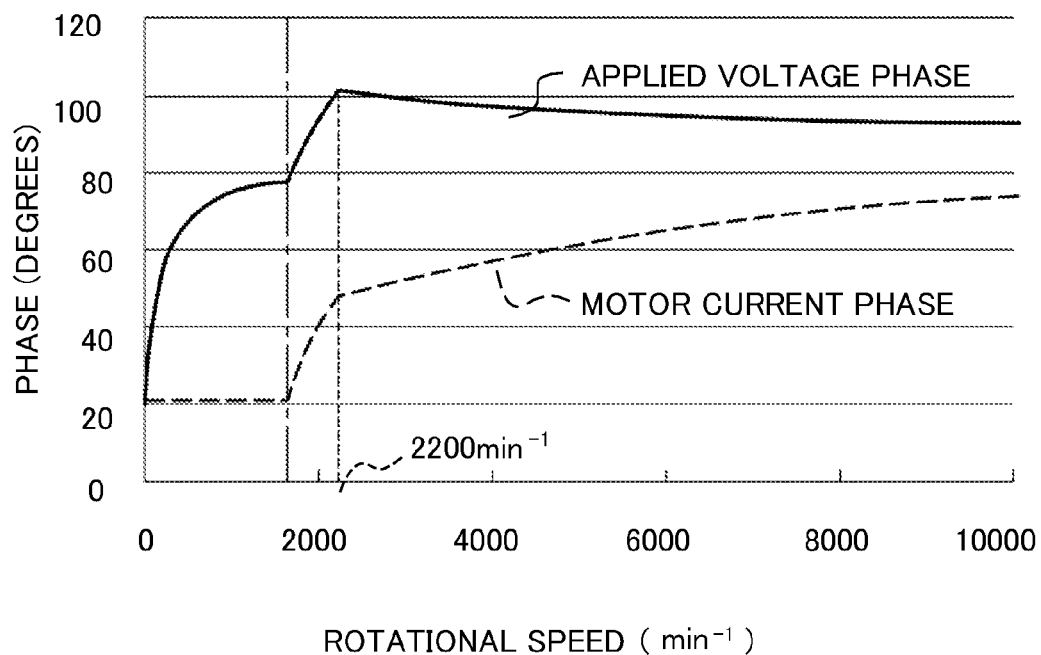
FIGS. 6A and 6B are graphs showing motor characteristics of a "single winding (1)" shown in FIG. 4.
Figure 6B:
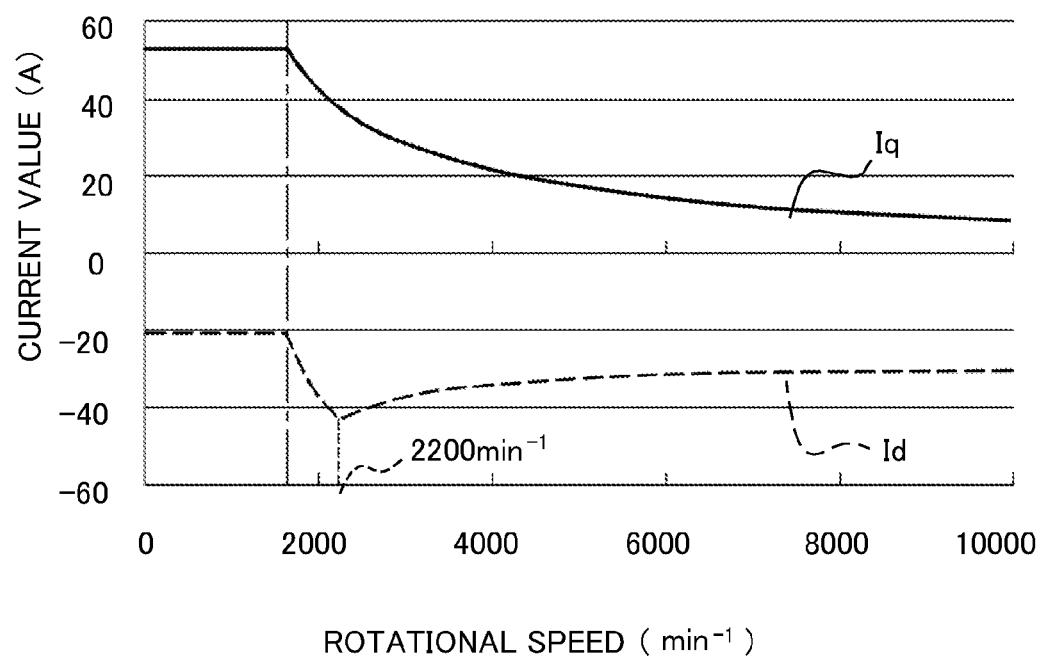

FIGS. 6A and 6B are graphs showing motor characteristics of the "single winding (1)" shown in FIG. 4. FIG. 6A is the graph showing a relationship between a voltage phase (advancing from the q-axis) and the rotational speed, as well as a relationship between a current phase (advancing from the q-axis) and the rotational speed. FIG. 6S is the graph showing a relationship between the d-axis current value and the rotational speed, as well as a relationship between the q-axis current value and the rotational speed.

In addition, FIGS. 7A and 7B are graphs showing motor characteristics of the "single winding (2)" shown in FIG. 4. FIG. 7A is the graph showing a relationship between a voltage phase (advancing from the q-axis) and the rotational speed, as well as a relationship between a current phase (advancing from the q-axis) and the rotational speed. FIG. 7B is the graph showing a relationship between the d-axis current value and the rotational speed, as well as a relationship between the q-axis current value and the rotational speed.

In FIG. 6A and FIG. 7A, the horizontal axis represents the rotational speed (the number of rotations per minute $(min^{-1})$), while the vertical axis represents the phase of the applied voltage (applied voltage phase), and the phase of the motor current (motor current phase).

Furthermore, in FIGS. 6B and 7B, the horizontal axis represents the rotational speed (the number of rotations per minute (min$^{-1}$)), while the vertical axis represents the current values of the d-axis current and the q-axis current.

In the case of the "single winding (1)" shown in FIGS. 6A and 6B, as shown in FIG. 6A, the applied voltage phase reaches approximately 100 degrees when the rotational speed is 2200 rotations min$^{-1}$. Thereafter, the applied voltage phase begins to retrogress to gradually come close to 90 degrees.

Simultaneously, as shown in FIG. 6B, the d-axis current value Id having increased in the negative direction begins to increase in the positive direction. The d-axis current value Id gradually comes close to the Id maximum current value (−28.5 A) shown in FIG. 4.

This characteristic means that the field weakening control limits the motor current based on the limit of the Id maximum current value before the current limit value of the system begins to put a limit on the motor current.

In contrast to this, in the case of the "single winding (2)" shown in FIGS. 7A and 7B, the d-axis current value Id of FIG. 7B has no point of change unlike the d-axis current value Id in the case of the "single winding (1) of FIG. 6B, and increases in the negative value without changes. The d-axis current value Id gradually comes close to the Id maximum current value (−58.5 A).

Furthermore, as shown in FIG. 7A, the applied voltage phase comes close to approximately 80 degrees although it increases.

The difference between the "single winding (1)" and the "single winding (2)" in terms of the characteristics causes the difference between the two windings in terms of the output torque in the high-speed rotation range.

Further descriptions will be provided using FIG. 8.

FIG. 8 is a graph showing a characteristic of the motor applied voltage phase vs. the output torque, which is obtained when the rotational speed is fixed at 2200 rotations min$^{-1}$, for each of the "single winding (1)" and the "single winding (2)." In this respect, a phase advancing from the q-axis is regarded as a positive one.

In FIG. 8, the horizontal axis represents the voltage phase (degrees), while the vertical axis represents the torque (Nm). Furthermore, the dashed line indicates the characteristic of the "single winding (1)," while the chain line indicates the characteristic of the "single winding (2)."

In both the characteristics of the "single winding (1)" and the "single winding (2)," the peak value of the output torque exists when the voltage phase is at approximately 100 degrees.

In other words, once the voltage phase exceeds approximately 100 degrees, the output torque becomes lower. This point means the limit torque which the corresponding motor can output (when no current limit is imposed by the system).

For this reason, the limit torque of the "single winding (1) is approximately 29 Nm, while the limit torque of the "single winding (2)" is approximate 57 Nm.

To put it concretely, since the limit torque of the "single winding (1)" at 2200 min$^{-1}$ is approximately 29 Nm, the motor cannot output a torque greater than approximately 29 Nm. In addition, even if the voltage phase is further advanced, the torque does not increase.

In other words, even if the d-axis current Id is increased in the negative direction, the output torque only decreases, and the stable point disappears.

For this reason, as shown in FIG. 6B, the d-axis current Id increases in the positive direction once the rotational speed exceeds 2200 rotations min$^{-1}$. That is to say, the decrease in the output torque makes the d-axis current Id reach a stable point.

In contrast to this, since as shown in FIG. 8, the limit torque of the "single winding (2)" at 2200 min$^{-1}$ is approximately 57 Nm, there is room, and the d-axis current Id increases in the negative direction without changes (in FIG. 7B).

Incidentally, as shown in FIG. 3, the maximum torque of the "single winding (2)" is limited to approximately 33 Nm. This is because the maximum value of the motor current is set at 40 A for the system.

In other words, the range of output torque is determined by the limit value (the 56.6-ampere peak current value) of the current capacity of the inverter circuit, but not by the limit torque of the motor.

To put it concretely, if the limit value of the current capacity of the inverter circuit is set larger, there is the room since the limit torque of the "single winding (2)" at 2200 min$^{-1}$ is approximately 57 Nm.

As described above, the Id maximum current value (the constraint condition based on the motor design values) of each of the "single winding (2)" and the "parallel connection" is −58.5 A. Since the Id maximum, current value is greater than the limit value of the current capacity of the inverter circuit, the motor can be used within a torque range which is not greater than the torque limit value.

To put it concretely, if the motor is designed such that as described above, the Id current maximum value (−Ke/Ld) becomes equal to or greater than the limit value of the current capacity of the system, the motor can be driven with the maximum torque of the system (the inverter circuit).

The conventional method using both the "series connection" and the "parallel connection" shown in FIG. 3 by switching the windings between the series connection and the parallel connection requires the motor to be stopped when the winding connections are switched. For this reason, systems to which the conventional method is applicable are limited.

In contrast to this, the embodiment enables the windings to be switched (without interruption) by only switching the drive of the inverter circuit. For this reason, systems to which the embodiment is applicable are not limited.

In other words, the embodiment enables the motor windings to be switched during continuous drive. For this reason, the embodiment is applicable to the drive system of the main motor of an electric car (electric motor).

Meanwhile, various factors may be used as conditions for switching between the inverter A and the inverter B. Such factors include the rotational speed, the relationship between the motor applied voltage and the DC voltage, the modulation ratio, a relational expression representing the relationship between the beforehand set rotational speed and the torque, and the motor current value.

Effects of First Embodiment

As described above, the use of the first embodiment makes it possible to achieve an increase in the efficiency of the winding-switching motor driving device, and an enlargement in the drive range of the winding-switching motor driving device.

Furthermore, the configuration of the embodiment always drives only either inverter circuit. For this reason, the inverter loss comes from either inverter circuit only.

Moreover, the embodiment needs no auxiliary switch circuit (semiconductor switch or mechanical switch) for switching the motor windings, and accordingly can realize the highly-efficient system compared with Patent Documents 2, 3 and 4.

In addition, the embodiment can enlarge the drive range compared with Patent Document 5.

Second Embodiment: Permanent Magnet Synchronous Motors

Next, as a second embodiment, another mode of the motor winding structure of the present invention will be described with reference to FIGS. 9 to 11.

Figure 9:
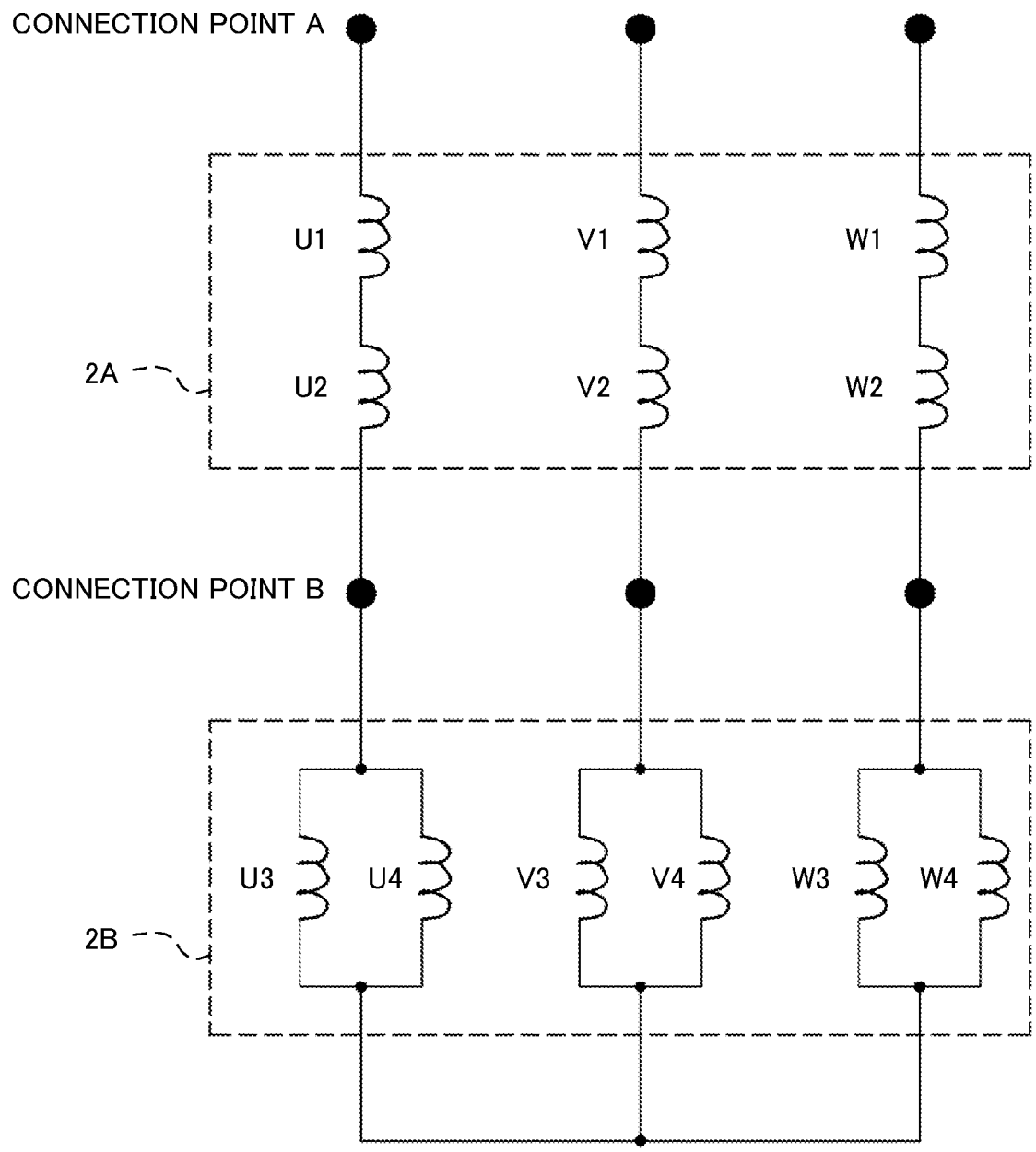
FIG. 9 is a diagram showing a winding structure of a permanent magnet synchronous motor of a second embodiment of the present invention.

FIG. 9 is a diagram showing a winding structure of a permanent magnet synchronous motor of the second embodiment of the present invention.

Figure 10:
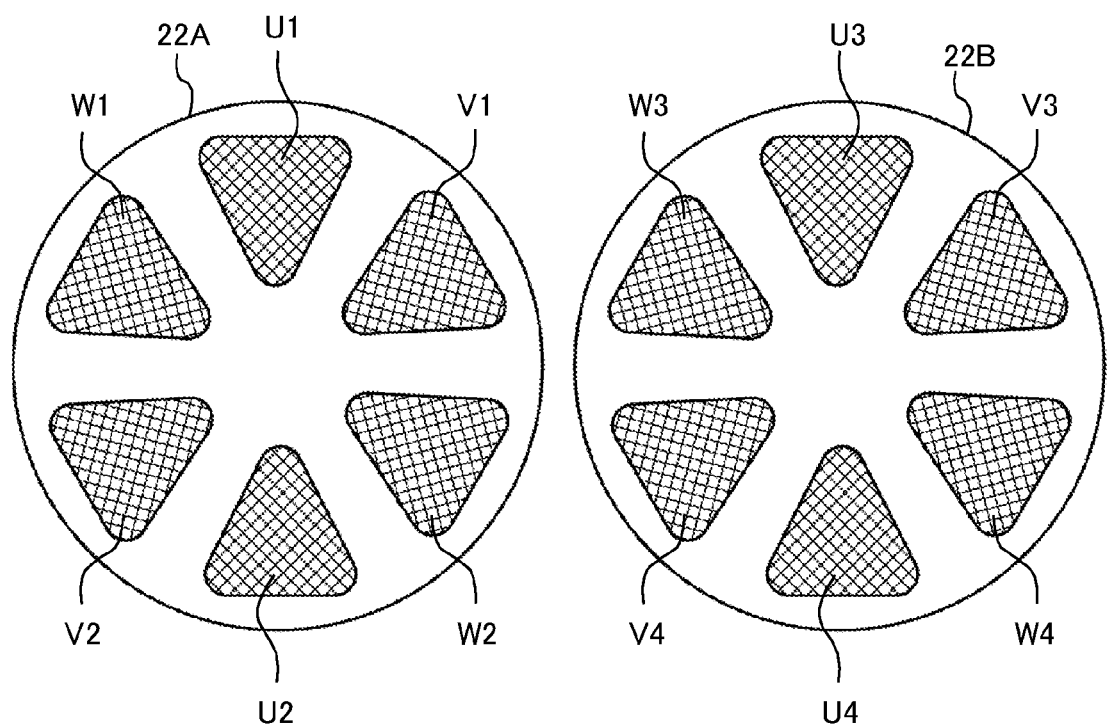
FIG. 10 includes diagrams each showing how windings are placed in each stator of an axial permanent magnet synchronous motor of the second embodiment of the present invention.

FIG. 10 includes diagrams each showing how windings are placed in each stator of an axial permanent magnet synchronous motor of the second embodiment of the present invention.

Figure 11:
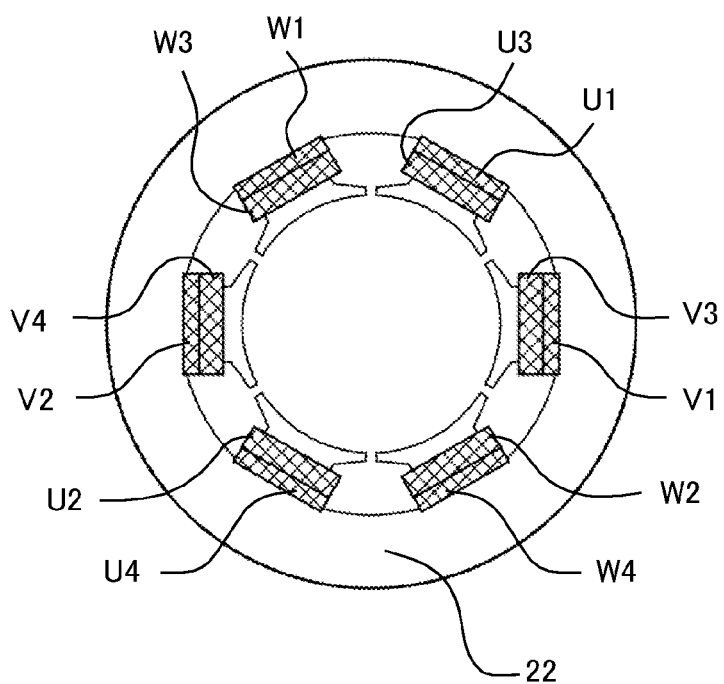
FIG. 11 is a diagram showing how windings are placed in a stator of a radial permanent magnet synchronous motor of the second embodiment of the present invention.

FIG. 11 is a diagram showing how windings are placed in a stator of a radial permanent magnet synchronous motor of the second embodiment of the present invention.

[Winding Configuration]

In FIG. 9, the winding configuration includes the winding 2A and the winding 2B, as in the case of the first embodiment. Furthermore, the winding 2A has a series connection configuration, and the winding 2B has a parallel connection configuration.

To put it concretely, the winding 2A includes two series-connected windings (U1, U2, V1, V2, W1, W2). The windings U1, U2 are connected together in series; the windings V1, V2 are connected together in series; and the windings W1, W2 are connected together in series.

Meanwhile, the winding 2B includes two parallel-connected windings (U3, U4, V3, V4, W3, W4). The windings U3, U4 are connected together in parallel; the windings V3, V4 are connected together in parallel; and the windings W3, W4 are connected together in parallel.

The employment of the above-described configuration makes it possible to set the induced voltage constant of the winding 2B at a half of that of the winding 2A, and the d-axis inductance of the winding 2B at a half of that of the winding 2A, although the thickness of the magnet and the air gap length are the same between the winding 2A and the winding 2B.

In other words, the ratio between the induced voltage constant and the d-axis inductance in the winding 2B can be set larger than that in the winding 2A and that in the overall winding (the winding 2A and the winding 2B). For this reason, the drive range while the winding 2B is driven during the high-speed rotation can be enlarged.

In addition, the winding 2B is formed by connecting the identical windings in parallel. For this reason, the winding resistance can be reduced to a half, and the effect of reducing the copper loss can be obtained.

However, if no change is made to the magnets or the shape of the motor that is to say, if only the winding is changed), the induced voltage constant of the overall winding becomes lower than under a specification in which the winding configuration includes only the series connection. For this reason, the maximum torque in the low-speed rotation range becomes lower.

In other words, if the torque is the same, the effect of reducing the current during the low-speed rotation becomes smaller. For this reason, the efficiency during the low-speed rotation becomes slightly lower.

Against this background, it is important to select a motor winding configuration in accordance with the drive range of the system and the required specification.

[Placement of Windings in Each Stator]

FIGS. 10 and 11 respectively show motor winding configurations in terms of how the windings are placed in each stator.

As described above, FIG. 10 includes the diagrams each showing how the windings are placed in each stator of the axial permanent magnet synchronous motor of the second embodiment of the present invention.

The second embodiment has been described using the motor having the axial gap structure. Nevertheless, the motor having the radial gap structure can bring about the same operation/working effect as the motor having the axial gap structure.

In other words, the second embodiment is applicable despite which structure the motor has.

Furthermore, as described above, FIG. 11 is the diagram showing how the windings are placed in the stator of the radial permanent magnet synchronous motor of the second embodiment of the present invention.

FIG. 11 illustrates that each two winding coils are arranged in layers. This is for the sake of explanatory convenience. However, the actual winding coils do not have to be arranged in layers. For example, length of wires for the U1 and U3 phases may be wound together into coils at the same time.

Third Embodiment: Permanent Magnet Synchronous Motor

Next, as a third embodiment, an example of a motor structure which is applied to an electric car driving motor (an in-wheel motor in particular) will be described referring to FIG. 12.

Figure 12:
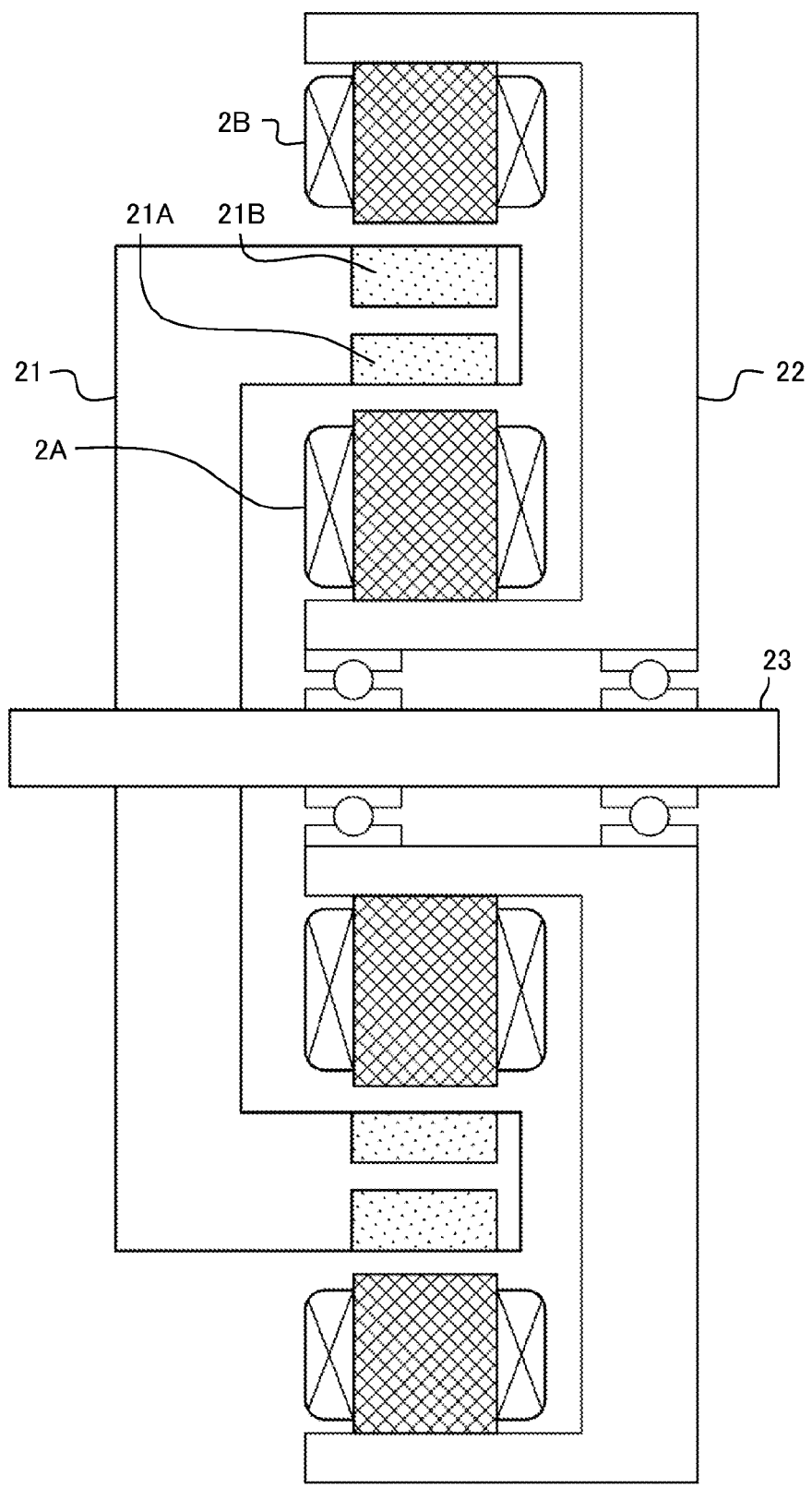
FIG. 12 is a diagram showing an example of the structure in which a permanent magnet synchronous motor of a third embodiment of the present invention is applied to an in-wheel motor.

FIG. 12 is a diagram showing an example of the structure in which a permanent magnet synchronous motor of the third embodiment of the present invention is applied to the in-wheel motor.

What is shown in FIG. 12 is the structure suitable for the in-wheel motor which is obtained by changing the structure shown in FIG. 1.

It should be noted that the reference signs in FIG. 12 correspond to parts and elements denoted by the same reference signs in FIG. 1. The parts and elements denoted by the same reference signs as those in FIG. 1 have the same characteristics.

No other major changes are made. Duplicate descriptions will be omitted.

Fourth Embodiment: Permanent Magnet Synchronous Motor

Next, as a fourth embodiment, an example of a motor structure which is applied to the radial gap structure will be described referring to FIG. 13.

Figure 13:
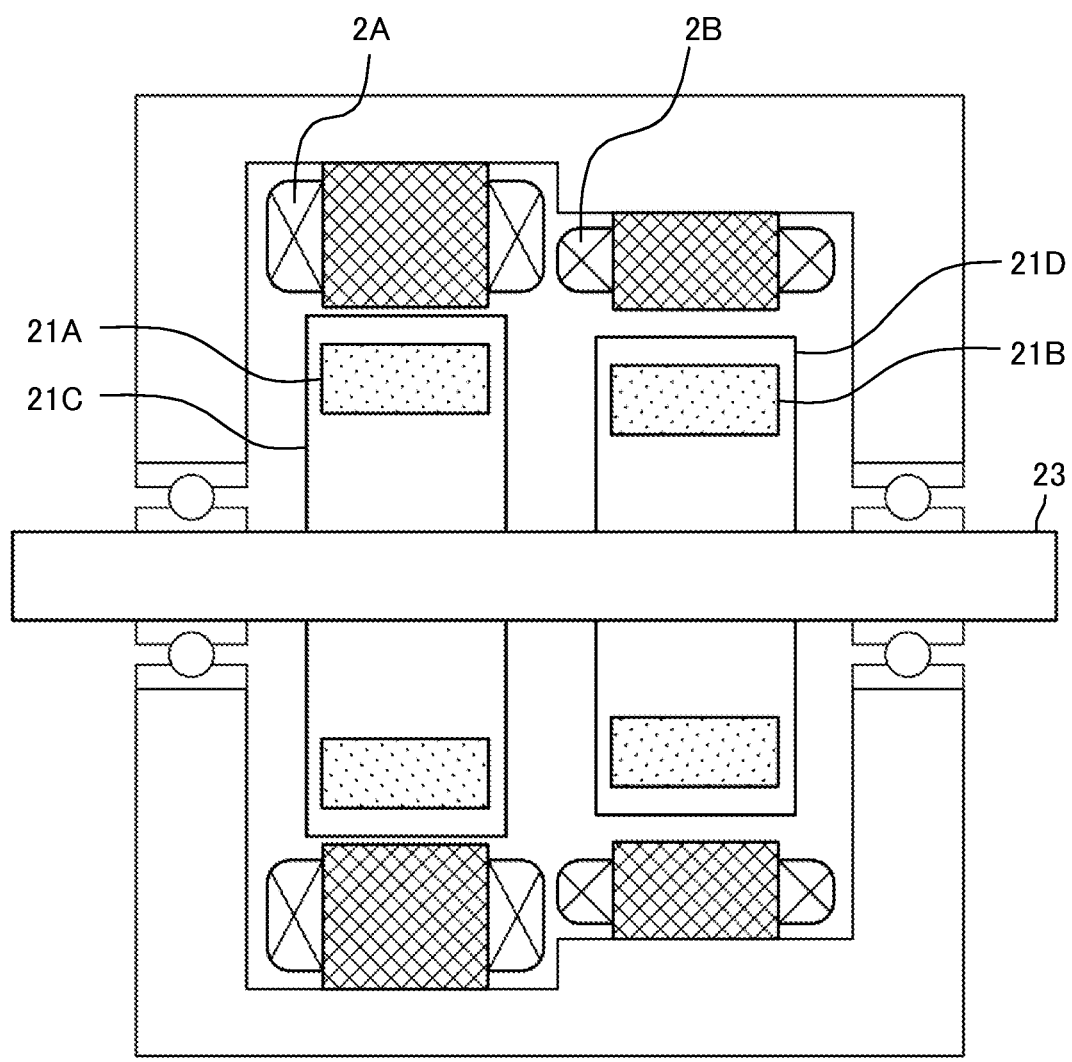
FIG. 13 is a diagram showing a second example of the motor structure in which a permanent magnet synchronous motor of a fourth embodiment of the present invention is applied to a radial gap structure.

FIG. 13 is a diagram showing a second example of the motor structure in which a permanent magnet synchronous motor of the fourth embodiment of the present invention is applied to the radial gap structure.

In the structure shown in FIG. 13, the windings (2A, 2B) are set on a stator 22, and the structure includes two rotors (21C, 21D)

The windings 2A, 2B are different from each other in terms of the size and the shape. In addition, the rotors 21C, 21D are different from each other in terms of the size and the shape.

It should be noted that the reference signs in FIG. 13 correspond to parts and elements denoted by the same reference signs in FIG. 1. The parts and elements denoted by the same reference signs as those in FIG. 1 have the same characteristics.

No other major changes are made. Duplicate descriptions will be omitted.

Fifth Embodiment: Permanent Magnet Synchronous Motor

Next, as a fifth embodiment, another example of the motor structure which is applied to the radial gap structure will be described referring to FIG. 14.

Figure 14:
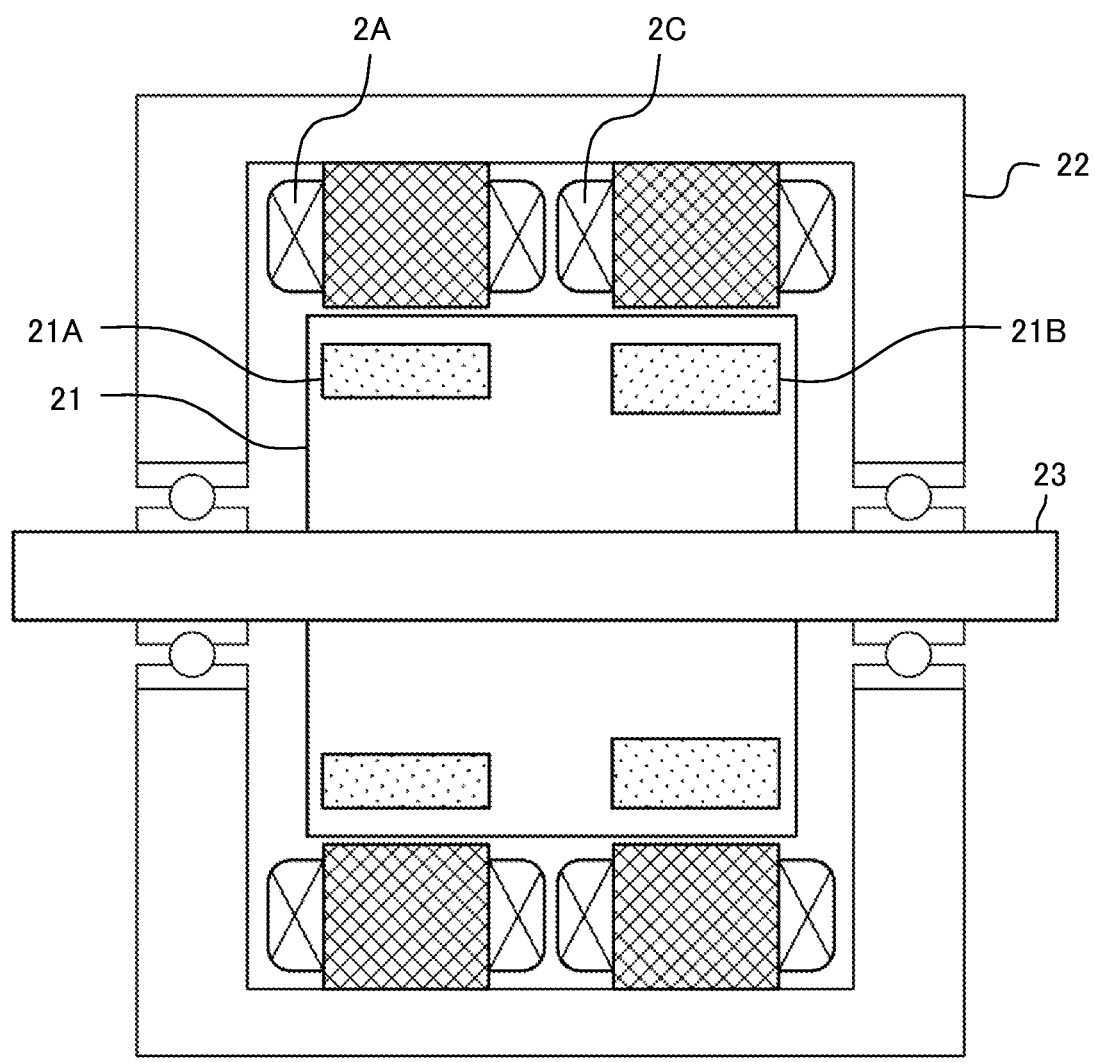
FIG. 14 is a diagram showing a third example of the motor structure in which a permanent magnet synchronous motor of a fifth embodiment of the present invention is applied to the radial cap structure.

FIG. 14 is a diagram showing a third example of the motor structure in which a permanent magnet synchronous motor of the fifth embodiment of the present invention is applied to the radial gap structure.

In FIG. 14, the rotor 21 has an integrated structure.

Furthermore, the winding 2A has a concentrated winding structure, as in the case of the first embodiment. A winding 2C has a distributed winding structure.

The distributed winding can make the winding inductance lower than the concentrated winding. For this reason, the inductance can be changed by changing the winding method. Incidentally, the reason why the inductance is different between the concentrated winding and the distributed winding is that the distribution of magnetic flux is different between the concentrated winding and the distributed winding.

The reference signs in FIG. 14 correspond to parts and elements denoted by the same reference signs in FIG. 1. The parts and elements denoted by the same reference slams as those in FIG. 1 have the same characteristics.

No other major changes are made. Duplicate descriptions will be omitted.

Sixth Embodiment: Winding-Switching Motor Driving Device

Figure 15:
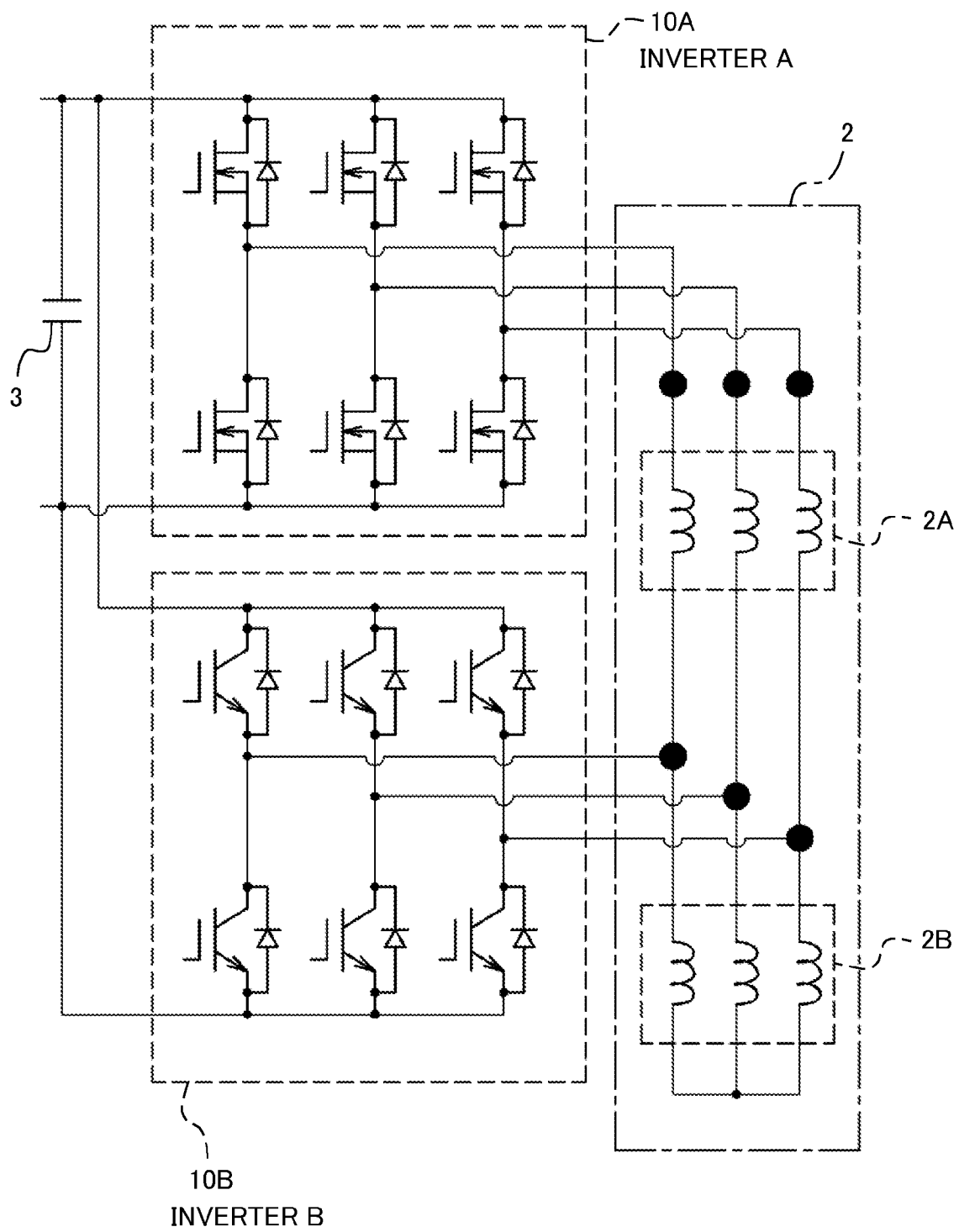
FIG. 15 is a diagram showing an example of a configuration of an inverter A and an example of a configuration of an inverter B in a winding-switching motor driving device of a sixth embodiment of the present invention.

Although the third to fifth embodiments have described the respective examples of the motor structure, a sixth embodiment will describe an example of a configuration of the switching elements of the inverter circuit in the winding-switching motor driving device with reference to FIG. 15.

FIG. 15 is a diagram showing an example of a configuration of the inverter A (10A) and an example of a configuration of the inverter B (10B) in the winding-switching motor driving device of the sixth embodiment of the present invention.

The diagram of FIG. 15 shows the same configuration as the motor driving device of FIG. 2. However, the switching elements included in the inverter circuit 10A (inverter A) are different.

In FIG. 15, MOSFETs (Metal-oxide-Semiconductor Field-Effect Transistors) are used as the switching elements (switching elements of a first type) of the inverter A configured to drive in the low-speed rotation range, that is to say, as the switching elements which is good at the low-conduction-loss characteristic for low current.

In addition, IGBTs (Insulate Gate Bipolar Transistors) are used as the switching elements (switching elements of a second type) of the inverter B for drive in the high-speed rotation range, that is to say, as the switching elements which is good at the low-conduction-loss characteristic for high current.

Since as described above, the switching elements good at the low-conduction-loss characteristic for low current and the switching elements good at the low-conduction-loss characteristic for high current are used properly, the loss can be further reduced.

The reference signs in FIG. 15 correspond to parts and elements denoted by the same reference signs in FIG. 2. The parts and elements denoted by the same reference signs as those in FIG. 2 have the same characteristics.

No other major changes are made. Duplicate descriptions will be omitted.

Seventh Embodiment: Winding-Switching Motor Driving Device

Figure 16:
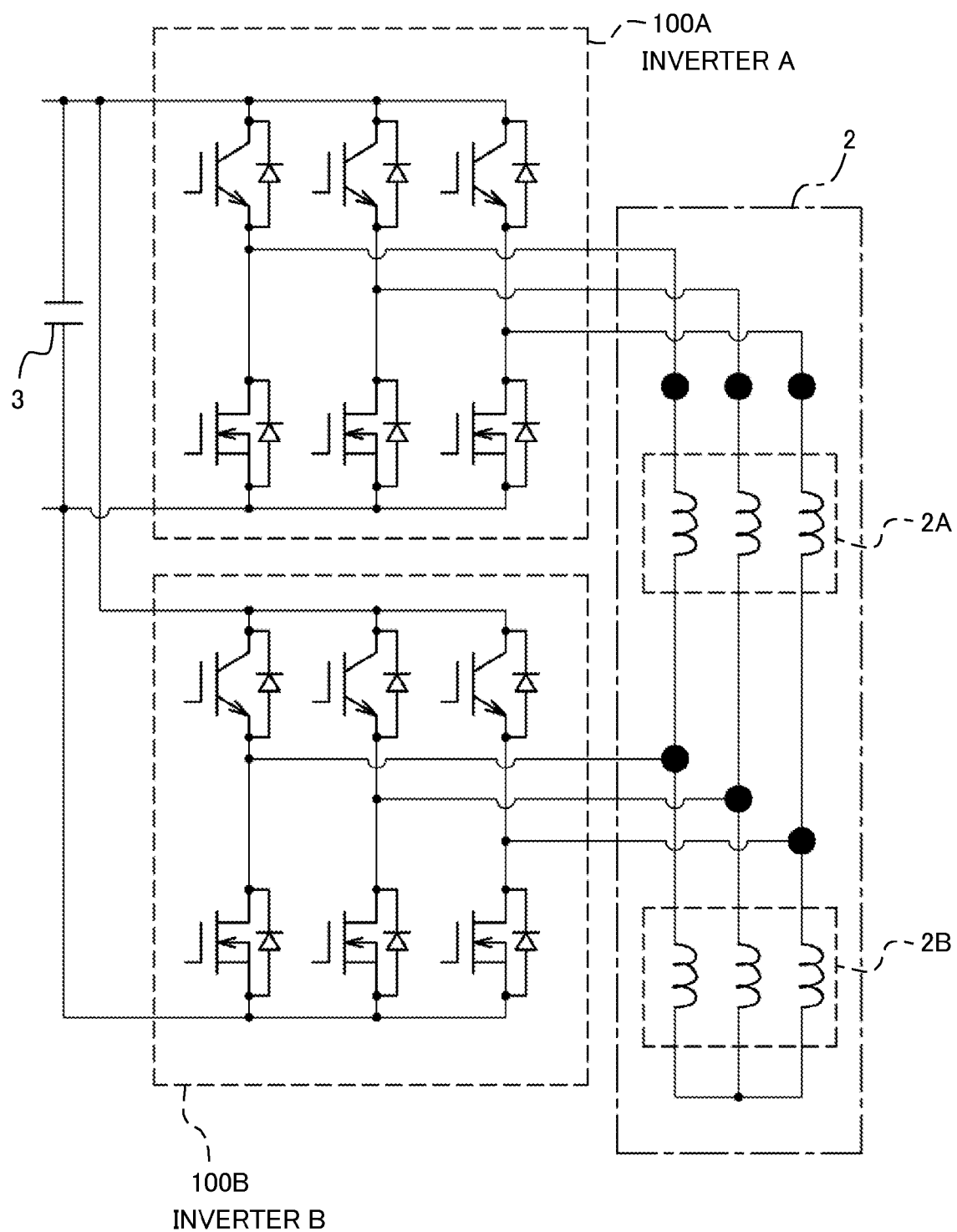
FIG. 16 is a diagram showing an example of a configuration of an inverter A and an example of a configuration of an inverter B in a winding-switching motor driving device of a seventh embodiment of the present invention.

Next, a seventh embodiment will describe another example of the configuration of the switching elements of the inverter circuit in the winding-switching motor driving device with reference to FIG. 16.

FIG. 16 is a diagram showing an example of a configuration of the inverter A (100A) and an example of a configuration of the inverter B (100B) in the winding-switching motor driving device of the seventh embodiment of the present invention.

The diagram of FIG. 16 shows the same configuration as the motor driving device of FIG. 2. However, the switching elements used in the inverter circuits 100A, 100B (inverters A, B) are different.

FIG. 16 shows the example where in each of the inverters A, B, the elements included in the upper arm are different from the elements included in the lower arm in terms of a characteristic.

FIG. 16 shows the example where in each of the inverters A, B, switching elements (for example, IGBTs) good at the low-conduction-loss characteristic for high current are applied to the switching elements in the upper arm, and switching elements (for example, SJ-MOSFETs) good at the low-conduction-loss characteristic for low current are applied to the switching elements in the lower arm.

In the case of the example of FIG. 16, since the SJ-MOSFETs applied to the lower arm are elements whose conduction loss is low particularly during low current, the winding-switching motor driving device is driven with a lower two-phase modulation method in which during low current, the number of switching operations in the lower arm is smaller so that the ON time in the lower arm is longer.

The winding-switching motor driving device is driven with an upper two-phase modulation method in which during high current, the number of switching operations in the upper arm is smaller so that the ON time in the upper arm is longer. Thereby, a further loss reduction can be achieved.

No other major changes are made. Duplicate descriptions will be omitted.

Eighth Embodiment: Winding-Switching Motor Driving Device

Next, as an eighth embodiment, a first example where the switching frequency of the inverter circuit of the winding-switching motor driving device is changed will be described with reference to FIG. 17.

Figure 17:
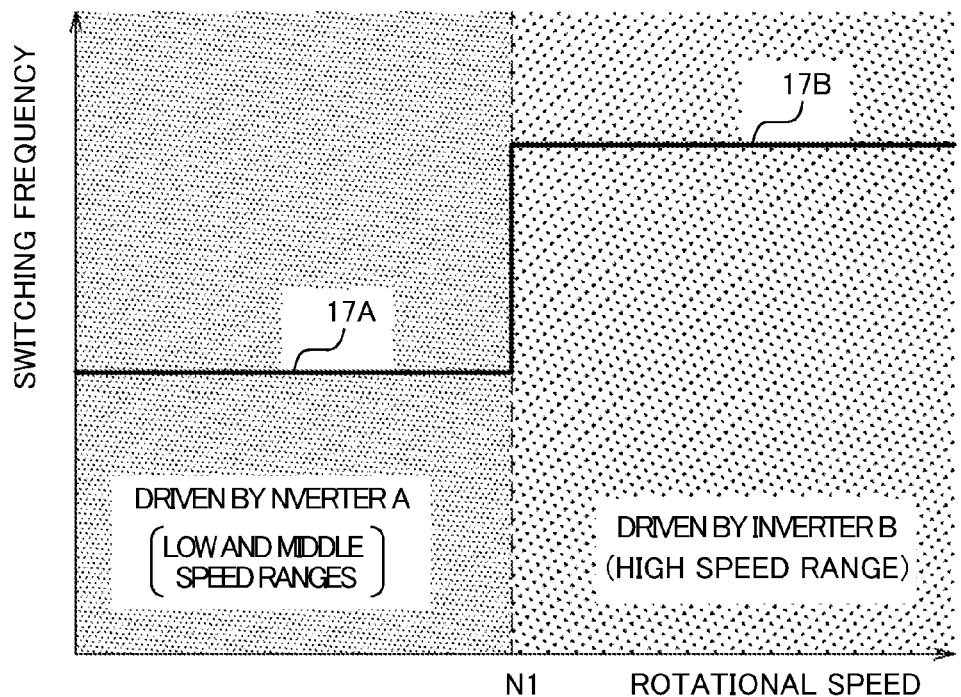
FIG. 17 is a diagram showing a first driving example where switching frequencies of the respective inverters A, B in a winding-switching motor driving device of an eighth embodiment of the present invention are changed.

FIG. 17 is a diagram showing the first driving example where the switching frequencies of the respective inverters A, B in the winding-switching motor driving device of the eighth embodiment of the present invention are changed.

In FIG. 17, the horizontal axis represents the rotational speed of the motor, while the vertical axis represents the switching frequency of the inverter circuit.

FIG. 17 shows the example where when the inverter circuit to drive is switched from the inverter A to the inverter B, the switching frequency is simultaneously changed.

With regard to iron loss of a motor, it is generally known that the iron loss can be made lower when the switching frequency of the inverter circuit is set higher. The effect of reducing the iron loss is obvious particularly in a high speed range.

The reason why the effect is obvious lies in an influence of a ripple component of the motor current which is caused by switching operations during PWM control. For this reason, as the inductance component of the motor becomes smaller, the influence of the ripple component becomes larger.

With this taken into consideration, the eighth embodiment sets the switching frequency of the inverter B for drive in the high-speed rotation range higher than the switching frequency of the inverter A for drive in the low-speed rotation range.

The eighth embodiment achieves a reduction in the iron loss of the motor, and minimizes the total loss of the motor and the inverter circuit, by setting the switching frequency of the inverter B for drive in the high-speed rotation range higher than the switching frequency of the inverter A for drive in the low-speed rotation range.

The configuration of the motor driving device is applicable to the circuit configuration of each foregoing embodiment. However, in order for the embodiment to exert the effect of this embodiment to a maximum extent, it is important that the elements good at a low-switching-loss characteristic be selected for the characteristic of the switching elements of the inverter B configured for drive in the high-speed rotation range.

In other words, use of wide-gap semiconductor elements such as SiC (Silicon Carbide) semiconductor elements and GaN (Gallium Nitride) semiconductor elements is effective to this end.

Ninth Embodiment: Winding-Switching Motor Driving Device

Next, as a ninth embodiment, a second example where the switching frequency of the inverter circuit of the winding-switching motor driving device is changed will be described with reference to FIG. 18.

Figure 18:
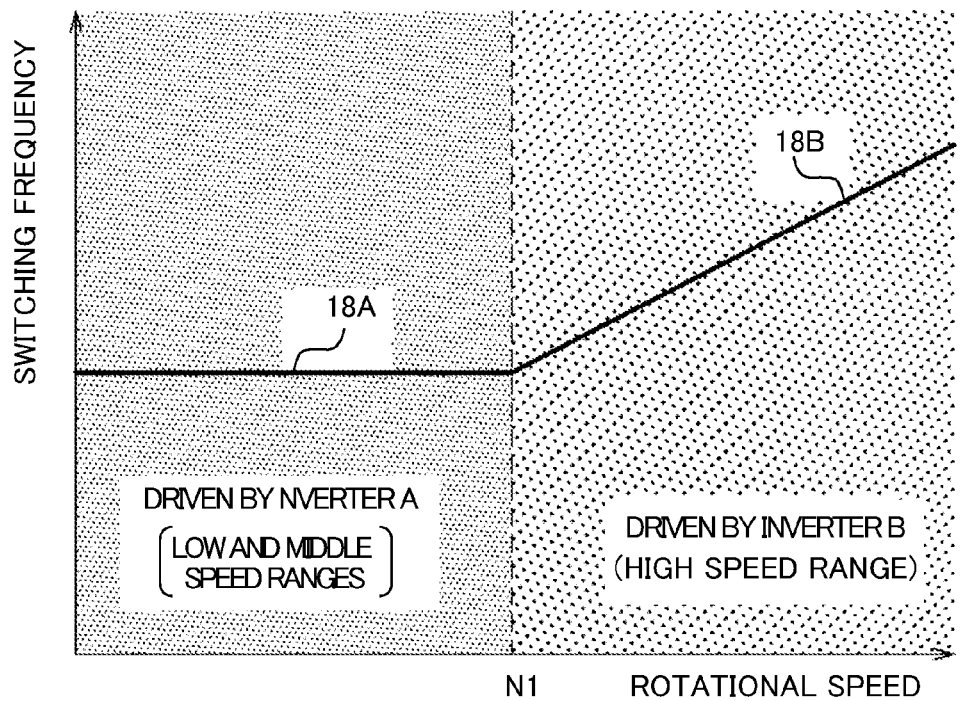
FIG. 18 is a diagram showing a second driving example where switching frequencies of the respective inverters A, B in a winding-switching motor driving device of a ninth embodiment of the present invention are changed.

FIG. 18 is a diagram showing the second driving example where the switching frequencies of the respective inverters A, B in the winding-switching motor driving device of the ninth embodiment of the present invention are changed.

In FIG. 18, the horizontal axis represents the rotational speed of the motor, while the vertical axis represents the switching frequency of the inverter circuit.

FIG. 18 shows the example where: when the inverter circuit to drive is switched from the inverter A to the inverter B, the switching frequency is simultaneously changed; and while the motor is driven by the inverter circuit B, the switching frequency is further changed in accordance with the rotational speed of the motor.

In FIG. 18, the switching frequency of the inverter B for the high speed range is variable to a more suitable frequency. For this reason, the efficiency can be further enhanced compared with the driving method shown in FIG. 17 where the switching frequency of the inverter B for the high speed range is constant.

The rest of the ninth embodiment is the same as that of the eighth embodiment shown in FIG. 17. For this reason, duplicate descriptions will be omitted.

Tenth Embodiment: Winding-Switching Motor Driving Device

The foregoing embodiments have the examples of the application for the improvement in the efficiency of the motor and the enlargement in the driving range of the motor.

However, in the foregoing embodiment, for example the embodiments where the winding-switching motor driving device is only configured to drive the first embodiment shown in FIG. 2, there is higher likelihood that while the motor is driven by the inverter B at a high speed greater than a predetermined value, an induced voltage of the motor occurs at the connection point A; and when the induced voltage becomes equal to or greater than the DC voltage of the inverter A, power regeneration from the motor takes place.

A tenth embodiment shows a first example of how to prevent the power regeneration which is caused by the induced voltage of the motor.

Figure 19:
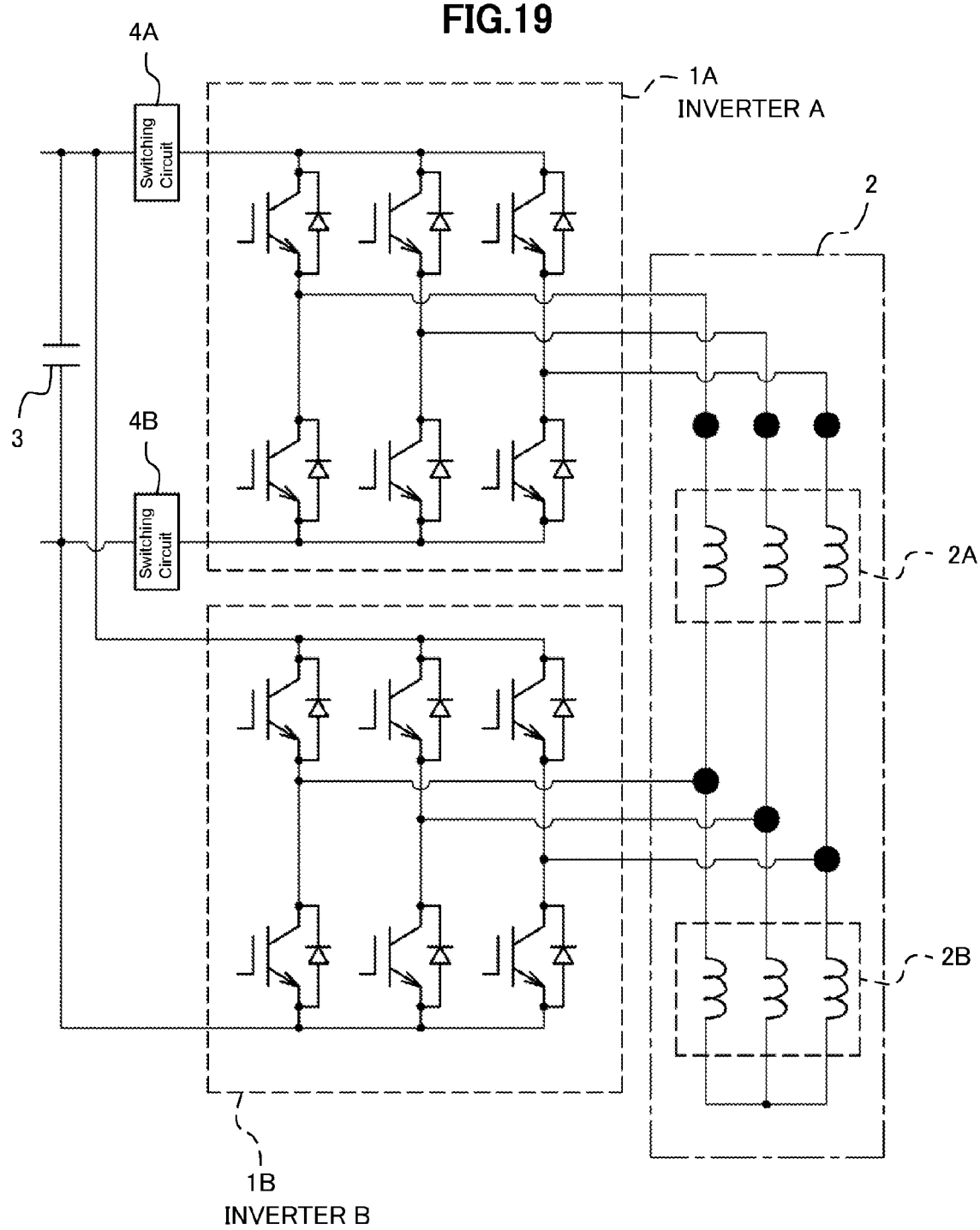
FIG. 19 is a diagram showing a first example of a circuit configuration for preventing the power regeneration of winding-switching motor driving device of a tenth embodiment of the present invention.

FIG. 19 is a diagram showing the first example of a circuit configuration for preventing the power regeneration of the winding-switching motor driving device of the tenth embodiment of the present invention.

The configuration shown in FIG. 19 includes the circuit shown in FIG. 2, and switching circuits 4A, 4B which are respectively provided to positive- and negative-side DC wirings of the inverter A.

In FIG. 2, or in FIG. 19, an induced voltage caused by the motor 2 is applied to the motor connection terminals of the inverter A which halts its operation while the motor is driven by the inverter B for the high-speed rotation range.

While the DC voltage of the smoothing capacitor 3 is equal to or greater than the produced induced voltage, no regenerative current flows. However, once the produced induced voltage exceeds the DC voltage of the smoothing capacitor 3, a regenerative voltage flows via a fly-wheel diode included in the inverter A. Once this phenomenon occurs, the motor drive becomes unstable.

With this taken into consideration, as shown in FIG. 19, the switching circuits 4A, 4B for preventing the power regeneration are added. Thus, the regenerative power of the motor 2 is prevented from flowing into the DC power supply (the capacitor 3) of the inverter A by disconnecting the switching circuits 4A, 4B (the electrically-insulating circuit configuration) before the power regeneration occurs.

The foregoing configuration makes it possible to prevent the power regeneration during the high-speed rotation, and to realize a stable high-speed rotation drive.

It should be noted that the switching circuits 4A, 4B may be mechanical relay switches or semiconductor relay switches. In the case where the mechanical switches are applied to the switching circuits 4A, 4B, the switching circuits 4A, 4B need to be switched back and forth with no current made to flow. However, no problem arises as long as the mechanical switches can be switched back and forth with the produced induced voltage lower than the DC voltage.

Meanwhile, in the case where the semiconductor switches are applied to the switching circuits 4A, 4B, the switching circuits 4A, 4B can be opened and closed without stopping the motor.

11th Embodiment: Winding-Switching Motor Driving Device

Next, as an 11th embodiment, a second example of how to prevent the power regeneration which is caused by the induced voltage of the motor will be shown.

Figure 20:
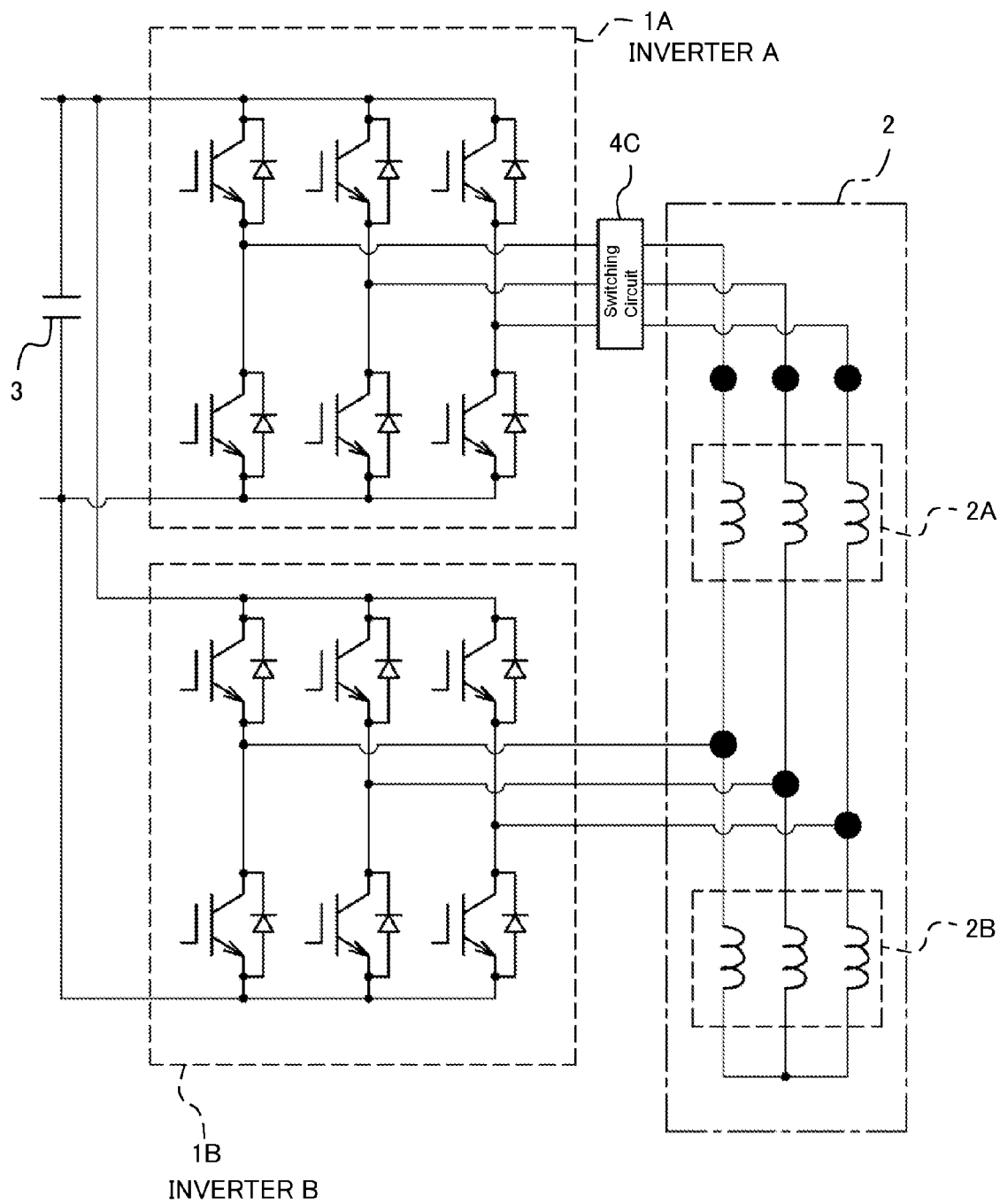
FIG. 20 is a diagram showing a second example of the circuit configuration for prevention power regeneration of a winding-switching motor driving device of an 11th embodiment of the present invention.

FIG. 20 is a diagram showing the second example of the circuit configuration for preventing the power regeneration of the winding-switching motor driving device of the 11th embodiment of the present invention.

The configuration shown in FIG. 20 includes the circuit shown in FIG. 2, and a switching circuit 4C which is provided between the inverter A and the motor 2.

As described in the tenth embodiment, the induced voltage caused by the motor 2 is applied to the motor connection terminals of the inverter A which halts its operation while the motor is driven by the inverter B for the high-speed rotation range.

While the DC voltage of the smoothing capacitor 3 is equal to or greater than the produced induced voltage, no regenerative current flows. However, once the produced induced voltage exceeds the DC voltage of the smoothing capacitor 3, a regenerative voltage flows via a fly-wheel diode included in the inverter A. Once this phenomenon occurs, the motor drive becomes unstable.

For the purpose of preventing this phenomenon, the switching circuit 40 for preventing the power regeneration is added.

Thus, the regenerative power of the motor 2 is prevented from flowing into the inverter A by disconnecting the switching circuit 4C before the power regeneration occurs.

The foregoing configuration makes it possible to prevent the power regeneration during the high-speed rotation, and to realize a stable high-speed rotation drive.

It should be noted that like the switching circuits 4A, 4B of the tenth embodiment, the switching circuit C may be a mechanical relay switch or a semiconductor relay switch. Duplicated descriptions will be omitted.

12th Embodiment: Winding-Switching Motor Driving Device

Figure 21:
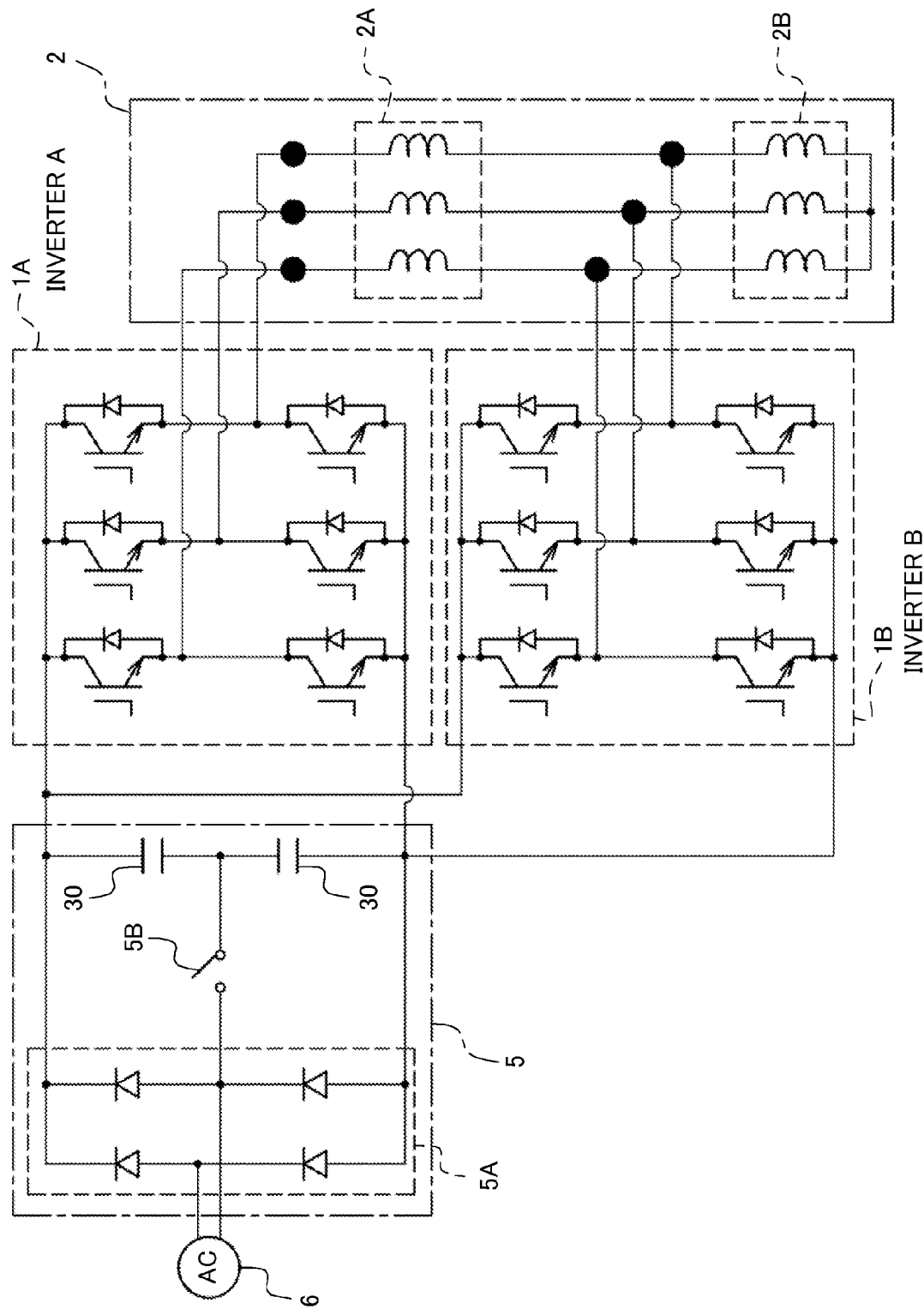
FIG. 21 is a diagram showing an example of a circuit configuration for doubling a voltage of a winding-switching motor driving device of a 12th embodiment of the present invention.
Figure 23:
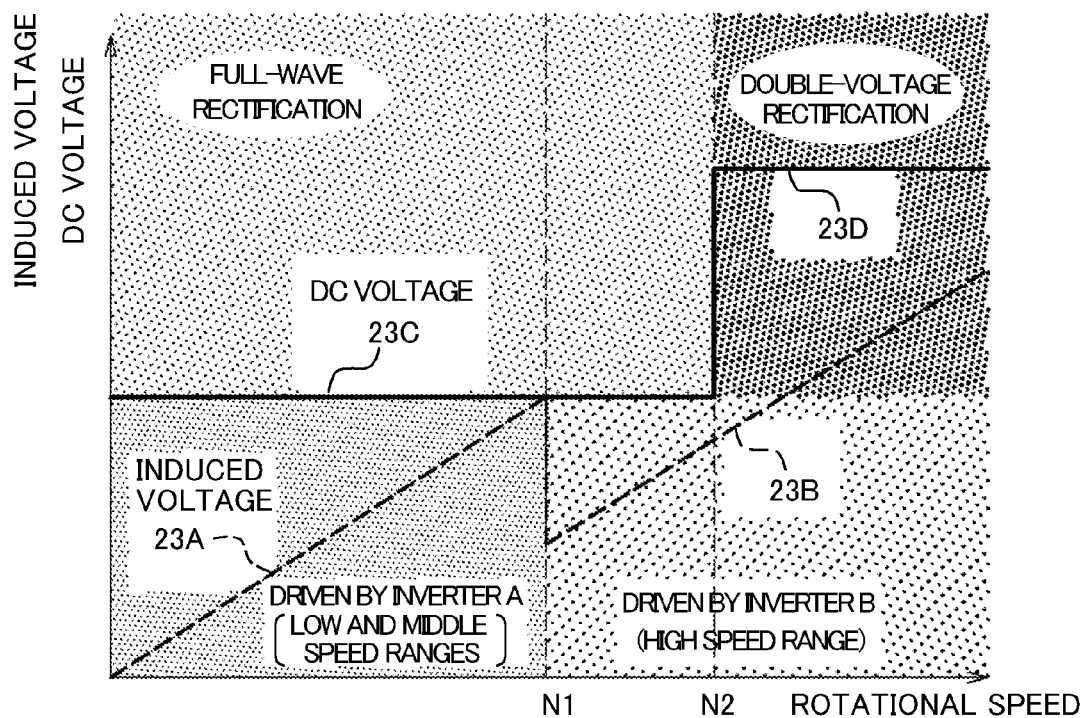
FIG. 23 is a graph showing an example of an operation characteristic of the full-wave/double-voltage switching rectifier circuit against a rotational speed of the winding-switching motor driving device of the 12th embodiment of the present invention.

Next, as a 12th embodiment, a first example of the motor driving device capable of boosting the DC voltage with reference to FIGS. 21 and 23.

FIG. 21 is a diagram showing the example of the circuit configuration for doubling the DC voltage of the winding-switching motor driving device of the 12th embodiment of the present invention.

The configuration shown in FIG. 21 includes the basic configuration shown in FIG. 2, and additionally a full-wave/double-voltage switching rectifier circuit 5 which is provided to an AC power supply 6.

In addition, the full-wave/double-voltage switching rectifier circuit 5 includes: a full-wave rectifier circuit 5A formed from a diode bridge; and a double-voltage rectifier circuit (30, 5B) including two capacitors 30 and a switch 5B.

Furthermore, for the purpose of switching between the full-wave rectifier circuit and the double-voltage rectifier circuit, the smoothing capacitor (capacitor) 3 shown in FIG. 2 is replaced with the configuration shown in FIG. 21 in which the two capacitors (smoothing capacitors) 30 are connected together in series.

The full-wave/double-voltage switching rectifier circuit 5 shown in FIG. 21 is a publicly-known technique. For this reason, detailed descriptions for its configuration and operation will be omitted.

Nevertheless, a simple sketch of the full-wave/double-voltage switching rectifier circuit 5 can be described as follows. Once the switch 5B for switching between the full wave and the double voltage is turned on, the full-wave/double-voltage switching rectifier circuit 5 operates as the double-voltage rectifier circuit. For this reason, the DC voltage which is the output from the full-wave/double-voltage switching rectifier circuit 5, for supplying the DC power supply of the inverter A changes in steps.

FIG. 23 is a graph showing an example of an operation characteristic of the full-wave/double-voltage switching rectifier circuit 5 against the rotational speed of the winding-switching motor driving device of the 12th embodiment of the present invention. Incidentally, FIG. 22 will be described later.

In FIG. 23, the horizontal axis represents the rotational speed of the motor, while the vertical axis represents the DC voltage outputted from the full-wave/double-voltage switching rectifier circuit 5, and the induced voltage of the motor.

A characteristic line 23C represents the DC voltage in a full-wave rectification range from the full-wave/double-voltage switching rectifier circuit 5. A characteristic line 23D represents the DC voltage in a double-voltage rectification range from the full-wave/double-voltage switching rectifier circuit 5.

Furthermore, a characteristic line 23A represents the induced voltage which is produced while the motor is driven by the inverter A in low and middle speed ranges. A characteristic line 23B represents the induced voltage which is produced while the motor is driven by the inverter B in the high speed range.

Incidentally, in FIG. 23, the full-wave rectification range is referred to as a "full-wave rectification." The double-voltage rectification range is referred to as a "double-voltage rectification." The low and middle speed ranges are referred to as a "low and middle speed ranges." The high speed range is referred to as a "high speed range."

As described above, FIG. 23 is the graph for explaining the operation which is performed using the circuit configuration shown in FIG. 21. As described in the foregoing embodiments, for example as described in the first embodiment, the motor in the low-speed rotation range is driven by the inverter A. While the motor is driven by the inverter A, the rotational speed of the motor is low, and the induced voltage represented by the characteristic line 23A is low as well. For this reason, no large DC voltage is needed. Thus, the operation is performed using the full-wave rectifier circuit.

Meanwhile, as the rotational speed of the motor becomes higher, the induced voltage represented by the characteristic line 23 becomes gradually higher. Thereafter, when the rotational speed of the motor reaches N1, the produced induced voltage becomes equal to the DC voltage. In other words, voltage saturation occurs. For this reason, if the rotational speed of the motor is allowed to become much higher, the motor comes to function as a generator to produce regenerative power. For the purpose of preventing the production of the regenerative power, the inverter configuration is switched to the inverter B for drive in the high-speed rotation range such that the DC voltage becomes higher than the induced voltage. Thereafter, the motor continues being driven by the inverter B.

The switching of the inverter configuration to the inverter B temporarily decreases the induced voltage to be applied to the inverter B (at a rotational speed from N1 to N2).

Subsequently, as the rotational speed increases, the induced voltage increases to become equal to or greater than the DC voltage. Before the induced voltage becomes equal to or greater than the DC voltage, at a rotational speed N2, the rectifier circuit configuration is switched to the double-voltage rectifier circuit (represented by a characteristic line 23D).

The switching of the operation of the full-wave/double-voltage switching rectifier circuit 5 to the double-voltage rectification doubles the amount of DC voltage outputted from the full-wave/double-voltage switching rectifier circuit 5. This enables the high-speed rotation drive without causing the voltage saturation.

It should be noted that the 12th embodiment needs no switching elements (4A, 4B in FIG. 19, or 4C in FIG. 20) since the 12th embodiment does not cause the power regeneration which has been described in the tenth and 11th embodiments.

Moreover, in the low-speed rotation range, the DC voltage can be kept at a low level. For this reason, the switching loss of the inverter A and the iron loss of the motor can be reduced, and highly-efficient drive can be achieved.

13th Embodiment: Winding-Switching Motor Driving Device

Figure 22:
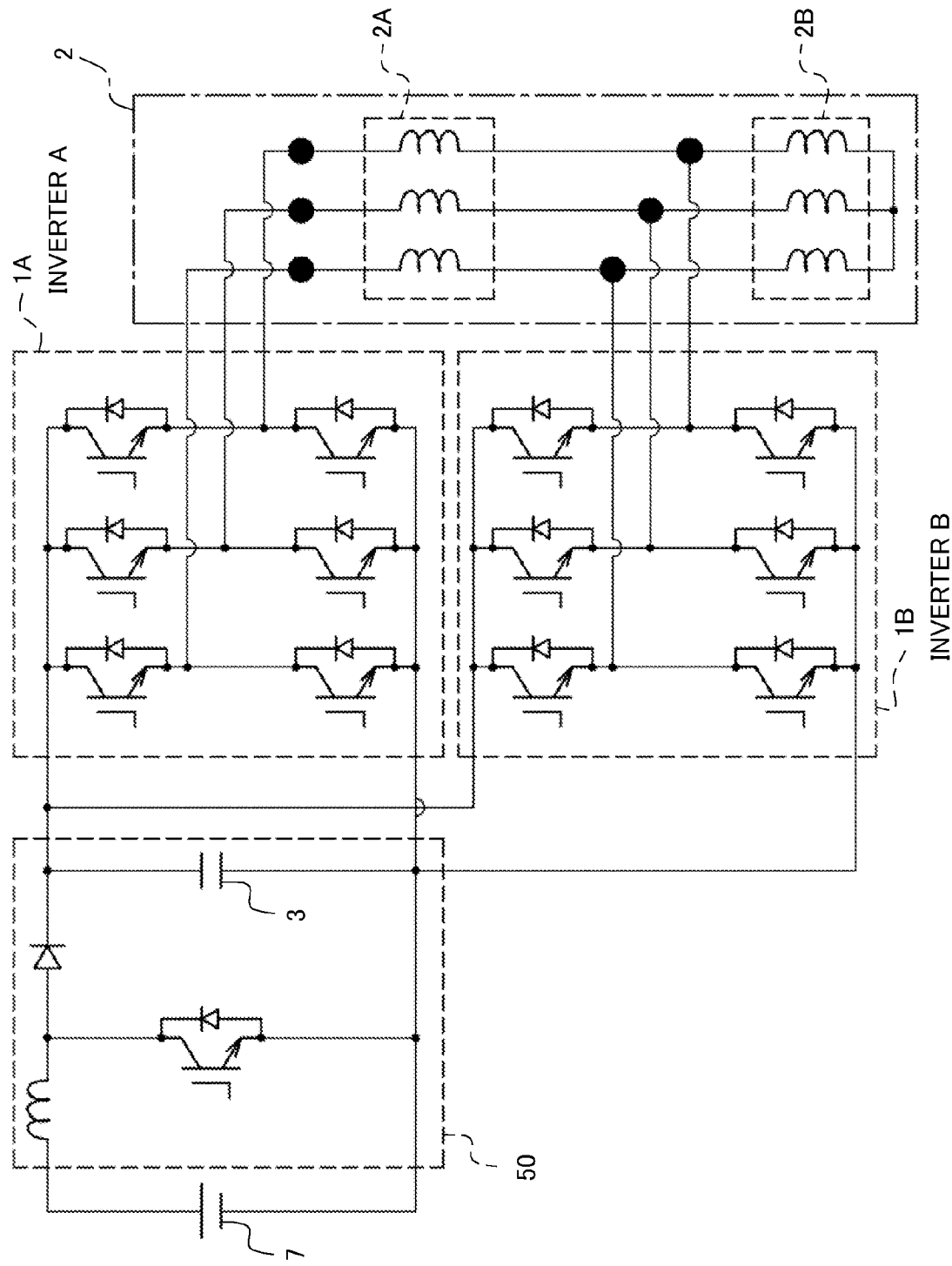
FIG. 22 is a diagram showing an example of a circuit configuration for boosting a voltage of a winding-switching motor driving device of a 13th embodiment of the present invention to an arbitrary level.
Figure 24:
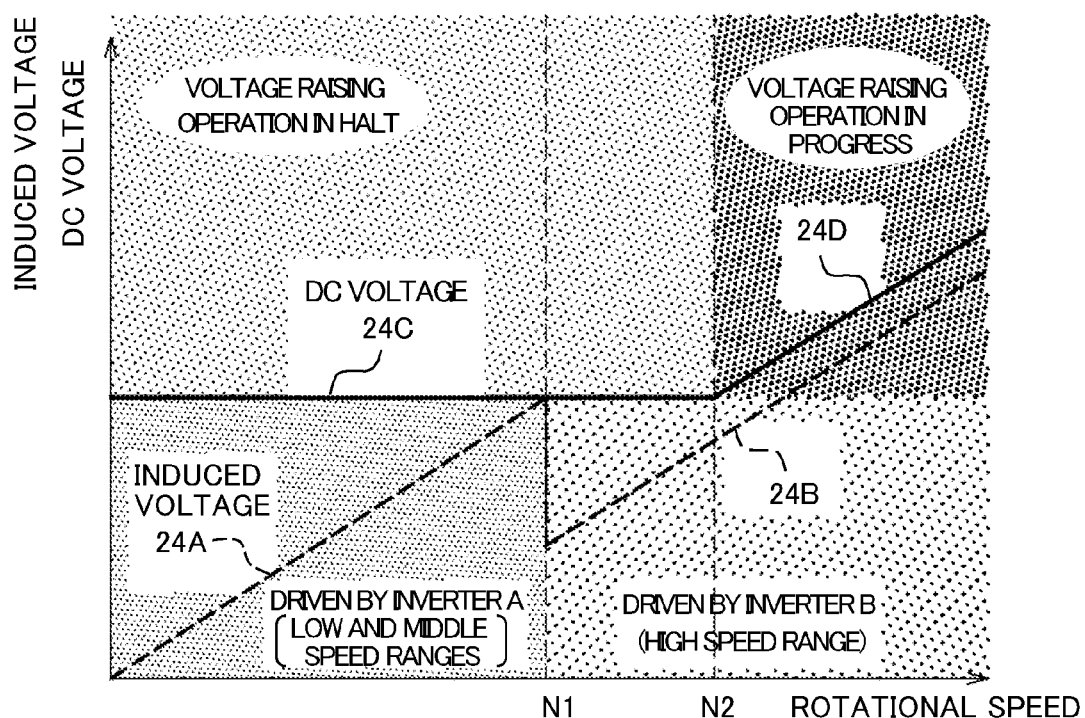
FIG. 24 is a graph showing an example of an operation characteristic of a boost chopper circuit against a rotational speed of the winding-switching motor driving device of the 13th embodiment of the present invention.

Next, as a 13th embodiment, a second example of the motor driving device capable of boosting the DC voltage with reference to FIGS. 22 and 24.

FIG. 22 is a diagram showing the example of the circuit configuration for boosting the DC voltage of the winding-switching motor driving device of the 13th embodiment of the present invention to an arbitrary level.

The configuration shown in FIG. 22 includes the basic configuration shown in FIG. 2, and additionally a converter circuit for boosting a DC voltage from a DC power supply 7 using a boost chopper circuit 50. The boost chopper circuit 50 is capable of boosting the DC voltage to an arbitrary level using a switching element As shown in FIG. 22, the boost chopper circuit 50 includes the switching element, an inductor, a diode, and a capacitor. This boost chopper circuit 50 is a publicly-known technique. For this reason, detailed descriptions for its configuration and operation will be omitted.

FIG. 24 is a graph showing an example of an operation characteristic of the boost chopper circuit 50 against the rotational speed of the winding-switching motor driving device of the 13th embodiment of the present invention.

In FIG. 24, the horizontal axis represents the rotational speed of the motor, while the vertical axis represents the DC voltage outputted from the boost chopper circuit 50, and the induced voltage of the motor.

A characteristic line 24C represents the DC voltage in a voltage raising operation halting range from the boost chopper circuit 50. A characteristic line 24D represents the DC voltage in a voltage raising operation range from the boost chopper circuit 50.

Furthermore, a characteristic line 24A represents the induced voltage which is produced while the motor is driven by the inverter A in the low and middle speed ranges. A characteristic line 24B represents the induced voltage which is produced while the motor is driven by the inverter B in the high speed range.

Incidentally, in FIG. 24, the voltage raising operation halting range is referred to as a "voltage raising operation in halt." The voltage raising operation range is referred to as a "voltage raising operation in progress." The low and middle speed ranges are referred to as a "low and middle speed ranges." The high speed range is referred to as a "high speed range."

As described above, FIG. 24 is the graph for explaining the operation which is performed using the circuit configuration shown in FIG. 22. As described in the foregoing embodiments, for example as described in the first embodiment, the motor in the low-speed rotation range is driven by the inverter A. While the motor is driven by the inverter A, the rotational speed of the motor is low, and the induced voltage represented by the characteristic line 24A is low as well. For this reason, no large DC voltage is needed. Thus, the boost chopper circuit 50 is in halt.

Meanwhile, as the rotational speed of the motor becomes higher, the induced voltage represented by the characteristic line 24A becomes gradually higher. Thereafter, when the rotational speed of the motor reaches N1, the produced induced voltage becomes equal to the DC voltage. In other words, voltage saturation occurs. For this reason, if the rotational speed of the motor is allowed to become much higher, the motor comes to function as the generator to produce regenerative power. For the purpose of preventing the production of the regenerative power, the inverter configuration is switched to the inverter B for drive in the high-speed rotation range such that the DC voltage becomes higher than the induced voltage. Thereafter, the motor continues being driven by the inverter B.

The switching of the inverter configuration to the inverter B temporarily decreases the induced voltage to be applied to the inverter B (at a rotational speed from N1 to N2).

Subsequently, as the rotational speed increases, the induced voltage increases to become equal to or greater than the DC voltage. Before the induced voltage becomes equal to or greater than the DC voltage, at the rotational speed N2, the boost chopper circuit 50 is made to perform the voltage raising operation (represented by a characteristic line 24D).

The voltage raising operation of the boost chopper circuit 50 enables the outputted DC voltage represented by the characteristic line 24D to become greater than the induced voltage of the motor. This enables the high-speed rotation drive without causing the voltage saturation.

It should be noted that the 13th embodiment needs no switching elements (4A, 4B in FIG. 19, or 40 in FIG. 20) since the 12th embodiment does not cause the power regeneration which has been described in the tenth and 11th embodiments.

Moreover, in the low-speed rotation range, the DC voltage can be kept at a low level. For this reason, the switching loss of the inverter A and the iron loss of the motor can be reduced, and highly-efficient drive can be achieved.

It should be noted that what makes the characteristic graph in FIG. 24 showing the characteristic of the circuit in FIG. 22 different from the characteristic graph in FIG. 23 showing the characteristic of the circuit in FIG. 21 is how to raise the DC voltage after the rotational speed reaches N2.

The circuit configuration of the 13th embodiment shown in FIG. 22 is capable of arbitrarily controlling the amount of DC voltage represented by the characteristic line 240. For this reason, the loss of the boost chopper circuit 50 can be reduced by controlling the DC current in the high-speed rotation range, which is represented by the characteristic line 24D, such that the DC current is reduced to a minimum necessary amount. Furthermore, the switching loss of the inverter B and the iron loss of the motor can be reduced.

14th Embodiment: Winding-Switching Motor Driving Device

Next, as a 14th embodiment, a winding-switching motor driving device using three inverter circuits will be described with reference to FIG. 25.

Figure 25:
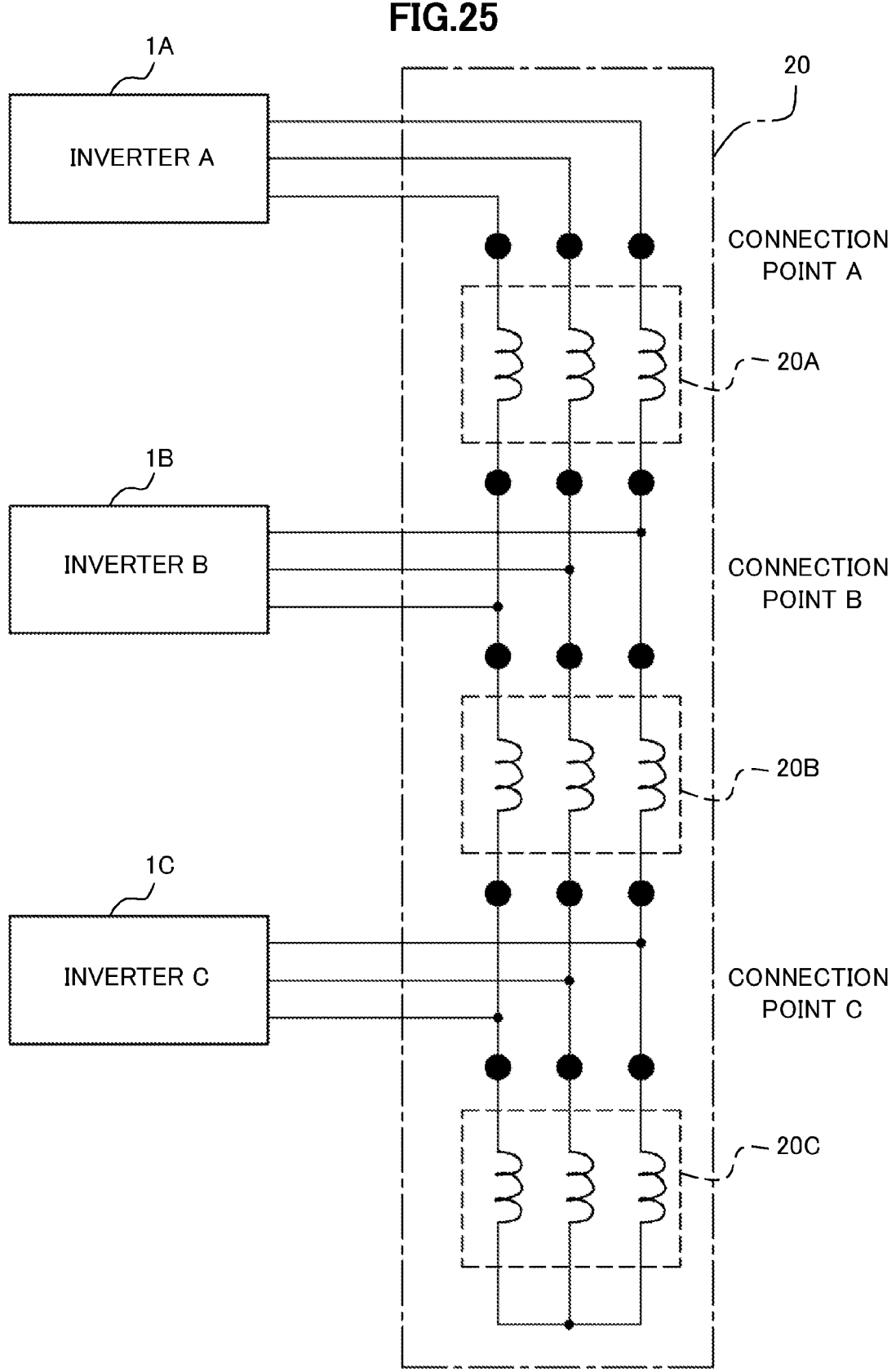
FIG. 25 is a diagram showing an example of a circuit configuration of a winding-switching motor driving device of a 14th embodiment of the present invention using three inverter circuits.

FIG. 25 is a diagram showing an example of the circuit configuration of the winding-switching motor driving device of the 14th embodiment of the present invention using the three inverter circuit.

FIG. 25 includes: a configuration in which the winding-switching motor driving device includes the three inverter circuits as a result of adding one inverter circuit to the basic configuration shown in FIG. 2 including the two inverter circuits; and a corresponding motor winding configuration.

In FIG. 25, a motor 20 has winding structures (20A, 20B, 20C) in which the number of series-connected windings is three for each phase. The basic configuration and operation of the inverter circuits as well as the basic configuration and operation of the motor are the same as those shown in FIG. 2.

The 14th embodiment is also capable of driving the inverter circuits (1A, 1B, 1C) for the low-speed rotation range, the middle-speed rotation range and the high-speed rotation range, respectively.

The employment of the configuration using the three inverters makes it possible to achieve a more efficient and wider range drive.

15th: Air Conditioner

Next, as a 15th embodiment, an air conditioner to which the permanent magnet synchronous motor and the winding-switching motor driving device of the present invention are applied will be described with reference to FIGS. 26 and 27.

Figure 26:
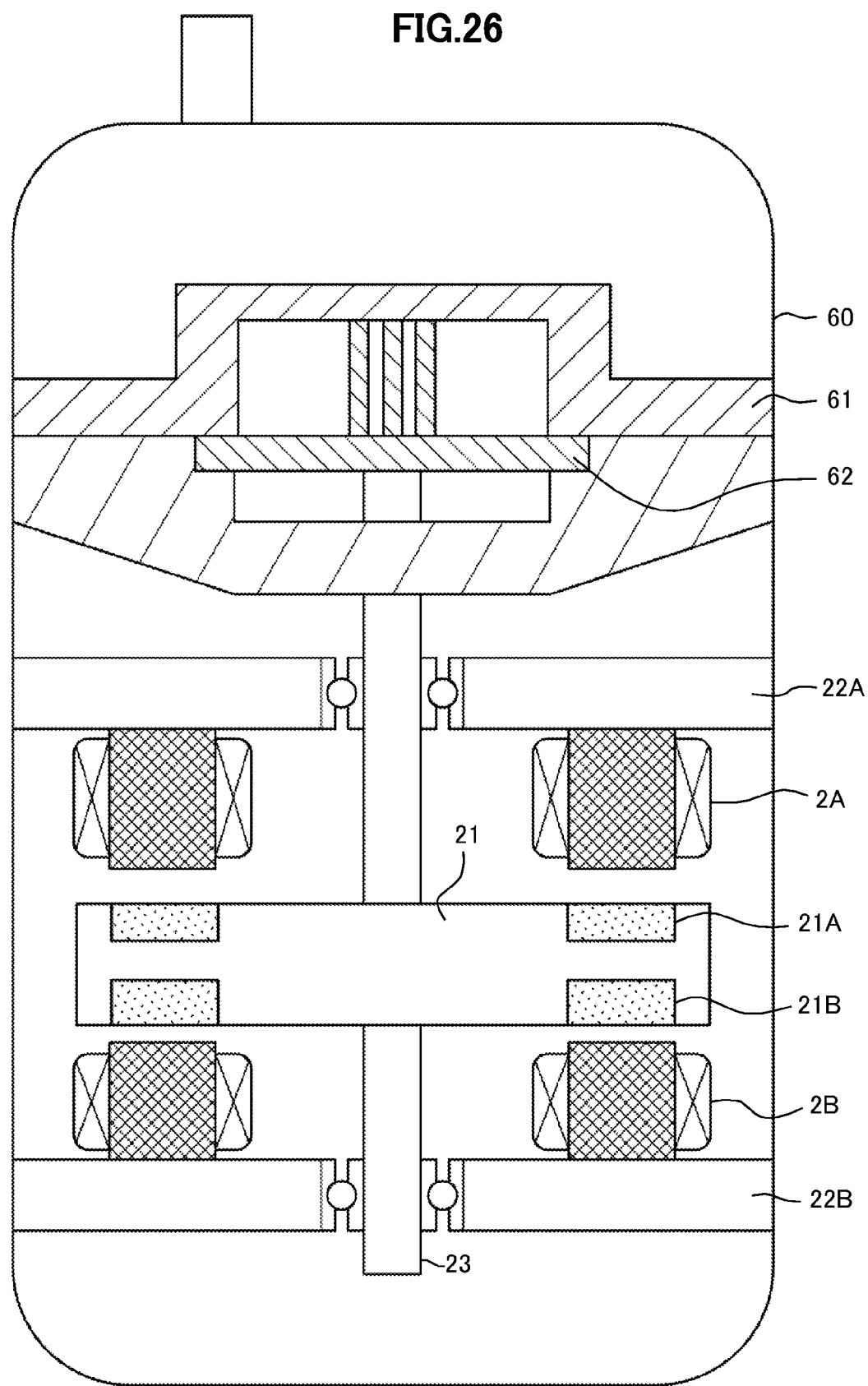
FIG. 26 is a diagram showing a schematic configuration of an air conditioner of a 15th embodiment of the present in which the permanent magnet synchronous motor of the first embodiment is incorporated in a compressor included in the air conditioner.

FIG. 26 is a diagram showing a schematic configuration of the air conditioner of the 15th embodiment of the present in which the permanent magnet synchronous motor of the first embodiment shown in FIG. 1 is incorporated in a compressor (scroll compressor) 60 included in the air conditioner.

In FIG. 26, the permanent magnet synchronous motor (21, 21A, 21B, 22A, 2A, 22B, 2B, 23) is incorporated in a fixed scroll 61 and a turning scroll 62.

Incidentally, the winding-switching motor driving device is not illustrated.

Figure 27:
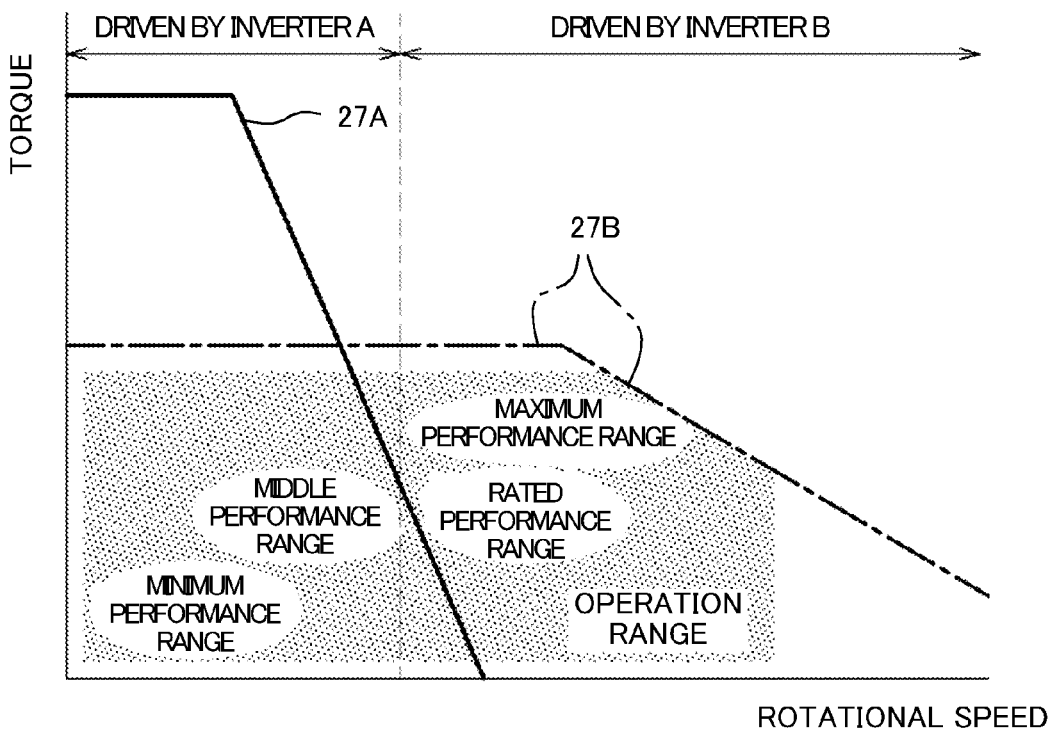
FIG. 27 is a graph showing an operation characteristic of a permanent magnet synchronous motor and a winding-switching motor driving device included in the air conditioner of the 15th embodiment of the present invention.

FIG. 27 is a graph showing an operation characteristic of the permanent magnet synchronous motor and the winding-switching motor driving device included in the air conditioner of the 15th embodiment of the present invention.

FIG. 27 shows a schematic image diagram of: a relationship between the rotational speed of the motor and the output torque which is observed when the permanent magnet synchronous motor and the winding-switching motor driving device of the present invention are applied to the air conditioner; and an operation range needed for the air conditioner.

FIG. 27 also shows performance ranges (minimum, middle, rated and maximum) to be used to calculate the APF (Annual Performance Factor) of the air conditioner.

In FIG. 27, the air conditioner needs to have a better APF because the APF value is a representative value of its efficiency performance. A rate of contribution of each performance range to the APF is set based on the occurrence frequency and the time length of operation. The rate of contribution of the minimum performance range and the rate of contribution of the middle performance range are higher.

In other words, the efficiency in the minimum performance range and the middle performance range needs to be enhanced in order to make the AFF value of the air conditioner higher to a large extent.

To this end, as shown in FIG. 27, the drive in the minimum performance range and the middle performance range is performed by use of the inverter A using all the series-connected windings of the motor 2 (represented by a characteristic line 27A).

In contrast to this, the drive in the rated performance range and the maximum performance range is performed by switching the inverter configuration to the inverter B using one winding of the motor 2 because a higher output is required in the rated performance range and the maximum performance range (represented by a characteristic line 27B).

As described above, the application of the permanent magnet synchronous motor and the winding-switching motor driving device of the present invention to the air conditioner makes it possible to achieve an increase in the efficiency of the air conditioner and an increase in the output of the air conditioner at the same time for the above-described reason.

Next, as a 16th embodiment, an electric vehicle (not illustrated) to which the permanent magnet synchronous motor and the winding-switching motor driving device of the present invention are applied will be described with reference to FIG. 28.

Figure 28:
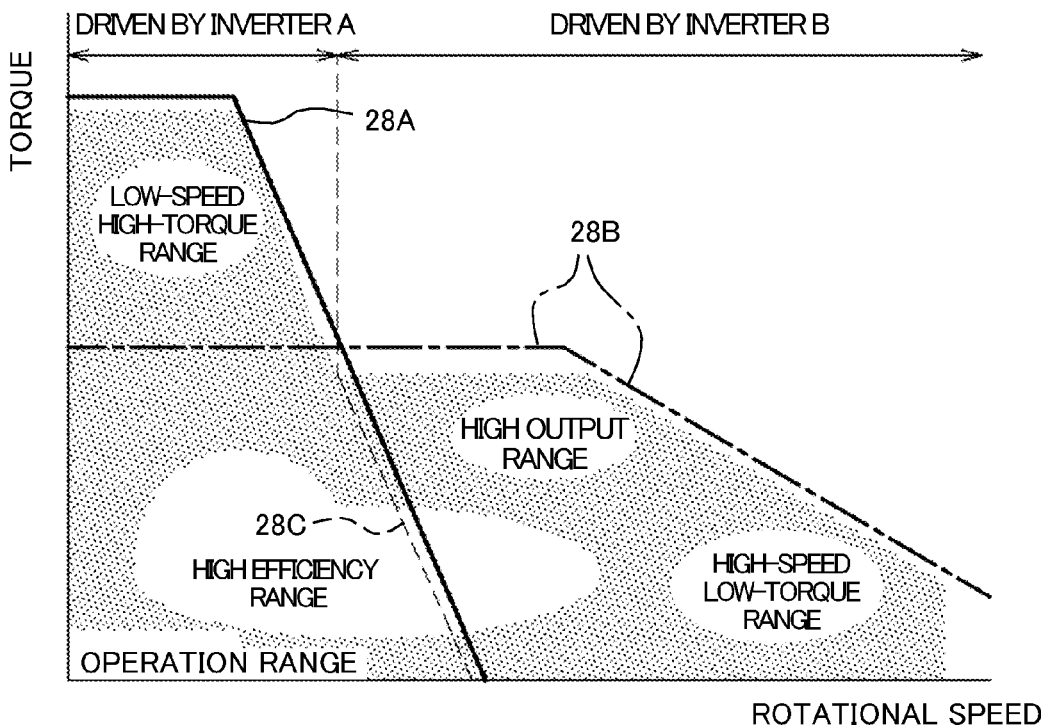
FIG. 28 is a diagram showing: a schematic operation characteristic of the permanent magnet synchronous motor which is used as a driving motor of an electric vehicle of a 16th embodiment of the present invention; and operation ranges.

FIG. 28 is a diagram showing: a schematic operation characteristic (a schematic image of the output torque) of the permanent magnet synchronous motor which is used as a driving motor of the electric vehicle of the 16th embodiment of the present invention; and the operation ranges.

The actual characteristic of the torque outputted from the motor is as shown in the characteristic graph of FIG. 3. However, the schematic diagram in FIG. 28 shows the characteristic as an image.

As shown in FIG. 23, the electric vehicle needs low-speed high torque when the electric vehicle starts to run, and when the electric vehicle runs along an uphill road. Meanwhile, the electric vehicle needs low-torque high-speed rotation while the electric vehicle is running at high speed.

Furthermore, the acceleration performance needs to be enhanced as well with comfortableness taken into consideration. Moreover, it is important to secure a high output range. Besides, the high efficiency range in a normal rotation range needs to be enlarged in order to improve the electricity mileage (power consumption efficiency).

To this end, the permanent magnet synchronous motor of any one of the first to fifth embodiments of the present invention is used as the driving motor of the electric vehicle (electric wheel), and the permanent magnet synchronous motor is driven using the winding-switching motor driving device of any one of the sixth to 14th embodiments of the present invention.

In other words, the drive in the low-speed high-torque range is performed using the inverter A, while the drive in the high output range and in the high-speed low-torque range is performed using the inverter B by switching the inverter configuration to the inverter B.

At the time of the inverter drive switching, if the timing of the switching is changed based on the relationship between the rotational speed and the torque, the high-efficiency range becomes larger.

As described above, the application of the permanent magnet synchronous motor and the winding-switching motor driving device of the present invention to the electric motor makes it possible to achieve an increase in the efficiency of the electric vehicle and an increase in the output of the electric vehicle at the same time.

Other Embodiments

The concrete descriptions have been provided for the present invention based on the foregoing embodiments. Nevertheless, the present invention is not limited to the foregoing embodiments, and various changes can be made to the present invention within a scope not departing from the gist of the present invention.

Further descriptions will be hereinbelow provided for other embodiments and modifications.

In the first embodiment, as described above, the number of turns of the winding 2B as the single winding (2) is set at 70% of the number of turns of the winding 2B as the single winding (1). Accordingly, the resistance value of the winding 2B as the single winding (2) is set at 70% of the resistance value of the winding 2B as the single winding (1), and is a value which is smaller than that of the single winding (1) by 30%.

In the first embodiment, no specific description has been provided for the line diameter of the winding 2B as the single winding (1) or the line diameter of the winding 2B as the single winding (2).

As described above, however, the resistance value of the winding 2B as the single winding (2) can be set at 70% of the resistance value of the winding 2B as the single winding (1).

In other words, in a case where the size (dimensions) of the motor is not changed, the line diameter of the winding can be increased (the volume of the winding can be increased) in exchange for the reduction in the number of turns (by 30%).

The employment of this method makes it possible to further reduce the winding resistance of the winding 2B as the single winding (2), and to reduce the copper loss (Joule heat).

[Choice and Combination of Switching Elements]

In the seventh embodiment, a further reduction in the loss of the inverter circuits can be achieved by choosing switching elements suitable for the operating conditions (current, voltage, modulation method) of each inverter circuit.

In other words, the seventh embodiment has explained that the switching operation in accordance with the characteristics of the switching elements in use is effective.

Furthermore, the breakdown voltage and current capacity may differ between the inverter A and the inverter B in FIG. 15, as well as between the inverter A and the inverter B in FIG. 16.

In other words, for example, the inverter A for drive in the low-speed rotation range drives with a relatively small current. For this reason, the inverter A can use switching elements and an inverter module with a lower current capacitance than the inverter B for drive in the high-speed rotation range. The inverter A makes it possible to reduce the costs of the inverter A itself.

The seventh embodiment shows the combination of the switching elements to be used. However, the combination of the switching elements is not limited to that of the seventh embodiment.

The switching elements can be combined in accordance with a system to which the present invention is applied.

[Change of Switching Frequency]

Referring to FIGS. 17 and 18, the eighth and ninth embodiments explain that when the inverter configuration of the winding-switching motor driving device is switched from the inverter A to the inverter B, the switching frequency is changed.

What frequency is optimum, however, differs depending on an object system.

For this reason, the change of the switching frequency is not limited to the operations shown in FIGS. 17 and 18. A method of changing the frequency is in accordance with a system to which the present invention is applied.

[Variations of DC Power Supply]

In the 13th embodiment explained with reference to FIG. 22, the boost chopper circuit 50 is connected to the DC power supply 7 as a power supply for the boost chopper circuit 50. However, the DC power supply is not limited to this example.

For example, a method of obtaining the DC power supply by rectifying the AC power supply may be employed.

Furthermore, a configuration which performs harmonic current suppression on the AC power supply using the boost chopper circuit 50 may be employed.

In other words, the DC voltage raising means (boost chopper circuit 50) is not limited or specified to the configuration of the boost chopper circuit 50 shown in FIG. 22.

[Use of Field Weakening Control in Combination]

The 12th embodiment explained with reference to FIG. 21, and the 13th embodiment described with reference to FIG. 22 explains that when the induced voltage increases to become close to the voltage saturation after the motor is driven by the inverter B, the DC voltage is immediately increased by the double-voltage rectification or the voltage raising operation.

However, the method of increasing the DC voltage is not limited to the double-voltage rectification or the voltage raising operation. For example, in a case where the drive of the motor using the field weakening control immediately after the occurrence of the voltage saturation is expected to reduce the loss of the motor driving device as a whole, a method of reducing the induced voltage using the field weakening control may be used in combination.

[Number of Inverter Circuits]

In the 14th embodiment explained with reference to FIG. 25, the inverter circuit is shown as including the inverter A (1A), the inverter B (1B), and the inverter C (3C). However, the inverter circuit does not necessary have to include the three connected inverters.

When the number of series connections of the windings (20A, 20B, 20C) driven by the inverter circuit is four or more, the number of corresponding inverter circuits may be four or more.

[Air Conditioner]

The 15th Embodiment explained with reference to FIGS. 26 and 27 describes the case where the compressor included in the air conditioner is the scroll compressor.

However, the compressor is not limited to the scroll compressor. A rotary compressor or a reciprocating compress may be used as the compressor included in the air conditioner.

[Other Applied Devices]

The 16th embodiment explained with reference to FIG. 28 describes the case where the permanent magnet synchronous motor and the winding-switching motor driving device of the present invention are applied to the electric vehicle.

As previously described, the electric vehicle needs the low-speed high torque when the electric vehicle starts to run, and when the electric vehicle runs along an uphill road.

However, what needs the low-speed high torque (shown in FIG. 28) is not limited to the electric vehicle. For example, the characteristic of the rotational speed vs. the output torque, which is shown in FIG. 28, is required for a laundry washing/drying machine as well. In other words, the permanent magnet synchronous motor and the winding-switching motor driving device of the present invention are effective for various applied devices, such as the laundry washing/drying machine, requiring the characteristic of the rotational speed vs. the output torque which is shown in FIG. 28.

REFERENCE SIGNS LIST 1A, 1B, 1C, 10A, 10B, 100A, 100b: inverter circuit (inverter);
2, 20: motor (winding)
2A, 2B, 2C, 20A, 20B, 20C, U1, U2, U3, U4, V1, V2, V3, V4, W1, W2, W3, W4: winding
21, 21C, 21D: rotor
21A, 21B: permanent magnet
22, 22A, 22B: stator
23: shaft
3, 30: smoothing capacitor, capacitor
4A, 4B, 4C, 5B: switching circuit switch
5: full-wave/double-voltage switching rectifier circuit
5A: full-wave rectifier circuit
6: AC power supply
7: DC power supply
50: boost chopper circuit
60: scroll compressor
61: fixed scroll
62: rotary scroll
81, 82: connection point

What is claimed is:

1. A motor system comprising:
a permanent magnet synchronous motor comprising:
at least two series-connected windings for each phase,
wherein the permanent magnet synchronous motor configured to be driven by selecting the windings using a multi-inverter driving device configured to switch between an inverter for low-speed drive and an inverter for high-speed drive, and
wherein a ratio of an induced voltage constant of at least one group of windings constituting the windings for the high-speed drive and a d-axis inductance is larger than a ratio of an induced voltage constant of all the series-connected windings to the d-axis inductance; and
a winding-switching motor driving device configured to drive the permanent magnet synchronous motor comprising:
a first inverter circuit configured to drive all the series-connected windings, and
a second inverter circuit configured to drive the at least one group of windings constituting the windings for the high-speed drive,
wherein one of the first inverter circuit and the second inverter circuit is selected depending on an operating condition of the permanent magnet synchronous motor, and
wherein a switching frequency of the second inverter circuit is set higher than that of the first inverter circuit.

2. The motor system according to claim 1, wherein the at least one group of windings of the series-connected windings are small in winding resistance.

3. The motor system according to claim 1, wherein the at least one group of windings of the series-connected windings are distributed windings.

4. The motor system according to claim 1, wherein
when the permanent magnet synchronous motor rotates at low speed, the first inverter circuit is selected, and
when the permanent magnet synchronous motor rotates at high speed, the second inverter circuit is selected.

5. The motor system according to claim 1, wherein
when the permanent magnet synchronous motor rotates at low speed, the permanent magnet synchronous motor is driven by a first inverter circuit configured to electrify windings which are small in a ratio of an induced voltage constant to a d-axis inductance, and
when the permanent magnet synchronous motor rotates at high speed, the permanent magnet synchronous motor is driven by a second inverter circuit configured to electrify windings which are large in a ratio of an induced voltage constant to a d-axis inductance.

6. The motor system according to claim 1, wherein one of the first inverter circuit and the second inverter circuit, which makes smaller current flow into the permanent magnet synchronous motor, is selected as a driving circuit depending on the operating condition of the permanent magnet synchronous motor.

7. The motor system according to claim 1, wherein
the first inverter circuit includes a first type of switching element,
the second inverter circuit includes a second type of switching element,
in a low-current operation range of the permanent magnet synchronous motor, the first type of switching element is better at low-conduction-loss characteristic than the second type of switching element, and
in a high-current operation range of the permanent magnet synchronous motor, the second type of switching element is better at the low-conduction-loss characteristic than the first type of switching element.

8. The motor system according to claim 1, wherein the first inverter circuit and the second inverter circuit are controlled to keep a state where a DC voltage is higher than an induced voltage produced by the permanent magnet synchronous motor.

9. A refrigeration air conditioner comprising:
the motor system according to claim 1; and
a compressor configured to be driven by the permanent magnet synchronous motor.

10. An electric vehicle comprising:
the motor system according to claim 1; and
an electric wheel configured to be driven by the permanent magnet synchronous motor.

11. A motor system comprising:
a permanent magnet synchronous motor comprising:
at least two series-connected windings for each phase,
wherein the permanent magnet synchronous motor configured to be driven by selecting the windings using a multi-inverter driving device configured to switch between an inverter for low-speed drive and an inverter for high-speed drive, and
wherein a ratio of an induced voltage constant of at least one group of windings constituting the windings for the high-speed drive and a d-axis inductance is larger than a ratio of an induced voltage constant of all the series-connected windings to the d-axis inductance; and
a winding-switching motor driving device configured to drive the permanent magnet synchronous motor comprising:
a first inverter circuit configured to drive all the series-connected windings, and
a second inverter circuit configured to drive the at least one group of windings constituting the windings for the high-speed drive, wherein one of the first inverter circuit and the second inverter circuit is selected depending on an operating condition of the permanent magnet synchronous motor, wherein the first inverter circuit includes a first type of switching element, wherein the second inverter circuit includes a second type of switching element, wherein in a low-current operation range of the permanent magnet synchronous motor, the first type of switching element is better at low-conduction-loss characteristic than the second type of switching element, and wherein in a high-current operation range of the permanent magnet synchronous motor, the second type of switching element is better at the low-conduction-loss characteristic than the first type of switching element.

12. A motor system comprising:

a permanent magnet synchronous motor comprising:
at least two series-connected windings for each phase,
wherein the permanent magnet synchronous motor configured to be driven by selecting the windings using a multi-inverter driving device configured to switch between an inverter for low-speed drive and an inverter for high-speed drive, and wherein a ratio of an induced voltage constant of at least one group of windings constituting the windings for the high-speed drive and a d-axis inductance is larger than a ratio of an induced voltage constant of all the series-connected windings to the d-axis inductance; and a winding-switching motor driving device configured to drive the permanent magnet synchronous motor comprising:

a first inverter circuit configured to drive all the series-connected windings, and a second inverter circuit configured to drive the at least one group of windings constituting the windings for the high-speed drive, wherein one of the first inverter circuit and the second inverter circuit is selected depending on an operating condition of the permanent magnet synchronous motor, and wherein the first inverter circuit and the second inverter circuit are controlled to keep a state where a DC voltage is higher than an induced voltage produced by the permanent magnet synchronous motor.

* * * * *